(12) United States Patent
Maeno et al.

(10) Patent No.: US 6,717,901 B2
(45) Date of Patent: Apr. 6, 2004

(54) STORAGE DEVICE HAVING A CHASIS INTEGRAL WITH A STATIONARY OPTICAL UNIT

(75) Inventors: Moriyasu Maeno, Kawasaki (JP); Hidenori Saito, Kawasaki (JP); Jun Aoki, Kawasaki (JP); Masahiko Kataoka, Kawasaki (JP); Kazuyuki Mizuishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 09/814,157

(22) Filed: Mar. 21, 2001

(65) Prior Publication Data

US 2001/0048650 A1 Dec. 6, 2001

(30) Foreign Application Priority Data

May 31, 2000 (JP) ........................................ 2000-163402

(51) Int. Cl.⁷ .............................................. G11B 33/02
(52) U.S. Cl. ..................................................... 369/75.1
(58) Field of Search ............................... 369/75.1, 77.2, 369/191, 258, 264, 75.2, 53.19, 112.01, 112.05

(56) References Cited

U.S. PATENT DOCUMENTS

| | | | | |
|---|---|---|---|---|
| 4,652,737 A | * | 3/1987 | Kowalski et al. | 250/201.5 |
| 5,471,453 A | | 11/1995 | Suzuki | 369/100 |
| 5,617,387 A | * | 4/1997 | Morita et al. | 369/44.23 |
| 5,737,292 A | | 4/1998 | Honda et al. | 369/75.1 |
| 5,790,501 A | * | 8/1998 | Kase et al. | 369/110.04 |
| 5,796,696 A | * | 8/1998 | Shigenai et al. | 369/75.1 |
| 6,141,309 A | | 10/2000 | Saitou et al. | 369/75.1 |
| 6,266,313 B1 | * | 7/2001 | Yanagawa et al. | 369/110.01 |
| 6,363,047 B1 | * | 3/2002 | Yamashita | 369/116 |

FOREIGN PATENT DOCUMENTS

| | | |
|---|---|---|
| JP | 58215739 | 12/1983 |
| JP | 5979593 | 5/1984 |
| JP | 61261838 | 11/1986 |
| JP | 1267842 | 10/1989 |
| JP | 411335 | 1/1992 |
| JP | 792480 | 4/1995 |
| JP | 7092480 | 4/1995 |
| JP | 7209630 | 8/1995 |
| JP | 8297856 | 11/1996 |
| JP | 10208260 | 8/1998 |

* cited by examiner

Primary Examiner—Julie Anne Watko
(74) Attorney, Agent, or Firm—Greer, Burns & Crain, Ltd.

(57) ABSTRACT

Provided is a compact inexpensive optical disk drive adaptable to high-density optical disks and having an improved stationary optical unit. The storage device has a first light path and a second light path defined therein. Along the first light path, laser light emanating from a laser light source is passed through a collimator lens and a beam splitter and routed to a movable optical system that is movable on an optical disk. Along the second light path, light reflected from the optical disk and returned from the movable optical system is split into a plurality of rays by the beam splitter, and one of the rays is routed to a sensor via a servo unit and a condenser. An angle at which the second light path meets the first light path is $90°+\alpha°$ where $\alpha$ denotes a positive number. At this time, a chassis of the storage device is die-cast, and a stationary optical unit having the first and second light paths defined therein is formed as an integral part of the die-cast chassis at an end of the chassis.

18 Claims, 32 Drawing Sheets

STORAGE DEVICE HAVING A CHASIS INTEGRAL WITH A STATIONARY OPTICAL UNIT

BACKGROUND OF THE INVENTION

1. Field of the Invention

The present invention relates to a storage device employing a replaceable storage medium. More particularly, this invention is concerned with a storage device such as an optical disk drive that employs a replaceable optical disk cartridge and uses a magneto-optical disk stowed in the cartridge.

2. Description of the Related Art

In recent years, the processing ability and processing speed of personal computers have improved, and the capacities of operating systems or application software packages for programs or data have expanded. Under these circumstances, storage devices are required to be compact and low-cost. Moreover, there is an increasing demand for a storage device offering a large storage capacity and a high processing speed.

An optical disk drive has begun to prevail as a storage device capable of meeting the demands for a compact, low cost, large storage capacity, and high processing speed device. An optical disk cartridge having an optical disk stowed in a cartridge is available as an optical disk employed in such an optical disk drive. Along with the prevalence of the optical disk drive employing the optical disk cartridge, there has arisen a demand for resistance to rough handling, stable performance, improved reliability, and reduction in cost.

In the optical disk drive, a stationary optical unit is included for emitting laser light, with which recorded data is read, to an optical disk, and reading and analyzing light reflected from the optical disk. The stationary optical unit is required to be compact. It is necessary to improve the efficiency in incorporating optical elements into the stationary optical. Moreover, the optical elements are required to be reliable.

As mentioned above, the stationary optical unit included in the optical disk drive employing an optical disk cartridge emits laser light with which data recorded on the optical disk is read, and reads and analyzes light reflected from the optical disk. Conventionally, the stationary optical unit is constructed as a unit separate from the body of the optical disk drive. In an effort to meet the recent demand for a compact optical disk drive, an attempt is made to integrate the stationary optical unit into the chassis of the optical disk drive.

For integrating the stationary optical unit into the chassis, a die-cast chassis is used as the chassis, and the stationary optical unit is located on the edge of the chassis. In the stationary optical unit, an outward light path, along which laser light emanating from a light source is propagated to a movable optical system including a carriage that is movable on an optical disk, runs along an extension of a direction of movement of the carriage. A homeward light path, along which light reflected from the optical disk and returned from the movable optical system to the stationary optical unit is split by a beam splitter, and the split laser light is routed to a sensor, runs perpendicular to the outward light path.

When the homeward light path runs perpendicularly to the outward light path in the stationary optical unit, the homeward light path must be isolated from other members of the optical disk drive for fear the members may interfere with the ray axis of the laser. This poses a problem in that the depth of the optical disk increases.

Moreover, if the stationary optical unit is integrated into a die-cast chassis, since the precision in the dimensions of the die-cast chassis is not very high, an auxiliary alignment device must be installed outside the optical disk drive in order to improve the precision in incorporating optical elements into the stationary optical unit. This poses a problem in that man-hours required for incorporating the optical elements into the stationary optical unit increase to raise the cost of the optical disk drive.

Furthermore, a sensor included in the stationary optical unit is locked in a mount using an adhesive. If the adhesion of the adhesive weakens with a rise in ambient temperature, a flexible printed-circuit board having the sensor mounted thereon shifts. This poses a problem in that the reliability of the sensor deteriorates.

SUMMARY OF THE INVENTION

Accordingly, an object of the present invention is to provide a compact inexpensive storage device such as an optical disk drive adaptable to high-density optical disks, and capable of solving the disadvantages of a stationary optical unit integrated into a die-cast chassis. Moreover, the storage device makes it possible to reduce the depth of an optical disk drive, decrease man-hours required to incorporate optical elements into the stationary optical unit, and suppress an increase in the cost of the optical disk drive. Furthermore, the storage device helps improve the reliability of a sensor.

For accomplishing the above object, the present invention presents the first to fifth aspects described below.

In the first aspect of the present invention, a storage device has a first light path and a second light path defined therein. Specifically, along the first light path, laser light emanating from a laser light source is passed through a collimator lens and a beam splitter and routed to a movable optical system that accesses an optical storage medium. Along the second light path, light reflected from the optical storage medium and returned from the movable optical system is split into a plurality of rays by a beam splitter, and one of the rays is routed to a sensor via a servo unit and a condenser. The sensor has the abilities to detect information recorded on the optical storage medium, detect the state of laser light converged on the optical storage medium, and detect a track of the optical storage medium to which laser light is irradiated. An angle at which the second light path meets the first light path is 90°+α where α denotes a positive number.

According to the first aspect, the angle at which the second light path meets the first light path is larger than 90°. Therefore, interference of the second light path with any other component can be avoided, and the overall length of the storage device can be reduced.

In the second aspect of the present invention, the storage device provided from the first aspect has an alignment projection formed on a surface of a servo unit to be disposed on the second light path which is opposed to the second light path. An alignment hole into which the alignment projection is fitted without any gap between them is bored in the bed of the second light path so that the alignment hole will coincide with the alignment projection.

According to the second aspect of the present invention, the man-hours required for disposing the servo unit on the second light path are reduced. This makes it possible to readily manufacture the storage device.

In the third aspect of the present invention, the storage device provided from the first or second aspect has a sensor, which is to be disposed on the second light path, mounted on a flexible printed-circuit board. A sensor-mounted portion of the flexible printed-circuit board is locked in a sensor mount. The other end of the flexible printed-circuit board is coupled to a printed-circuit board placed on the back of the chassis on which the second light path is defined. The sensor mount has a concave part that receives the sensor-mounted portion of the flexible printed-circuit board, and a leading-out groove used to lead the flexible printed-circuit board out of the concave part. A wall against which an end of the sensor-mounted portion of the flexible printed-circuit board abuts is formed on one edge of the concave part. The sensor-mounted portion of the flexible printed-circuit board is locked in the concave part with the end thereof abutting against the wall.

According to the third aspect, the sensor-mounted portion of the flexible printed-circuit board will not be shifted despite a rise in ambient temperature. This leads to improved reliability of the sensor.

In the fourth aspect of the present invention, the storage device provided from the first aspect has the chassis thereof die-cast. A stationary optical unit having the first and second light paths defined therein is formed as an integral part of the die-cast chassis at an end of the chassis.

According to the fourth aspect, the solid-state optical unit is formed as an integral part of the chassis. Consequently, the storage device can be manufactured readily.

In the fifth aspect of the present invention, any of the storage devices provided from the first to fourth aspects has the beam splitter thereof realized with an ordinary beam splitter whose reflecting surface is inclined at 45°. The beam splitter is turned by $\alpha/2°$ with respect to the ray axis of light propagating along the first light path.

According to the fifth aspect, an existing beam splitter can be adopted. This helps suppress an increase in the cost of the storage device.

In the sixth aspect of the present invention, there is provided a chassis of a storage device employing an optical storage medium, whose base is comprised of at least a movable optical unit stowage for installing a movable optical unit which moves across the tracks of the storage medium, and stationary optical unit for emitting a laser light and for receiving a reflected laser light from the movable optical unit, the stationary optical unit comprising: a first groove for forming a first optical path which leads the laser light emitted from a laser light source to the movable optical unit; and a second groove for forming a second optical path which leads the reflected laser light from the movable optical unit to a sensor; wherein an angle at which the second groove meets the first groove is $90°+\alpha$ where $\alpha$ denotes a positive number.

According to the sixth aspect, a chassis having a stationary optical unit can be formed compact so that the overall length of the optical disk can be minimized.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Embodiments of a storage device in accordance with the present invention will be described in conjunction with the drawings by taking an optical disk drive that is an exemplary embodiment for instance.

Figure 1:
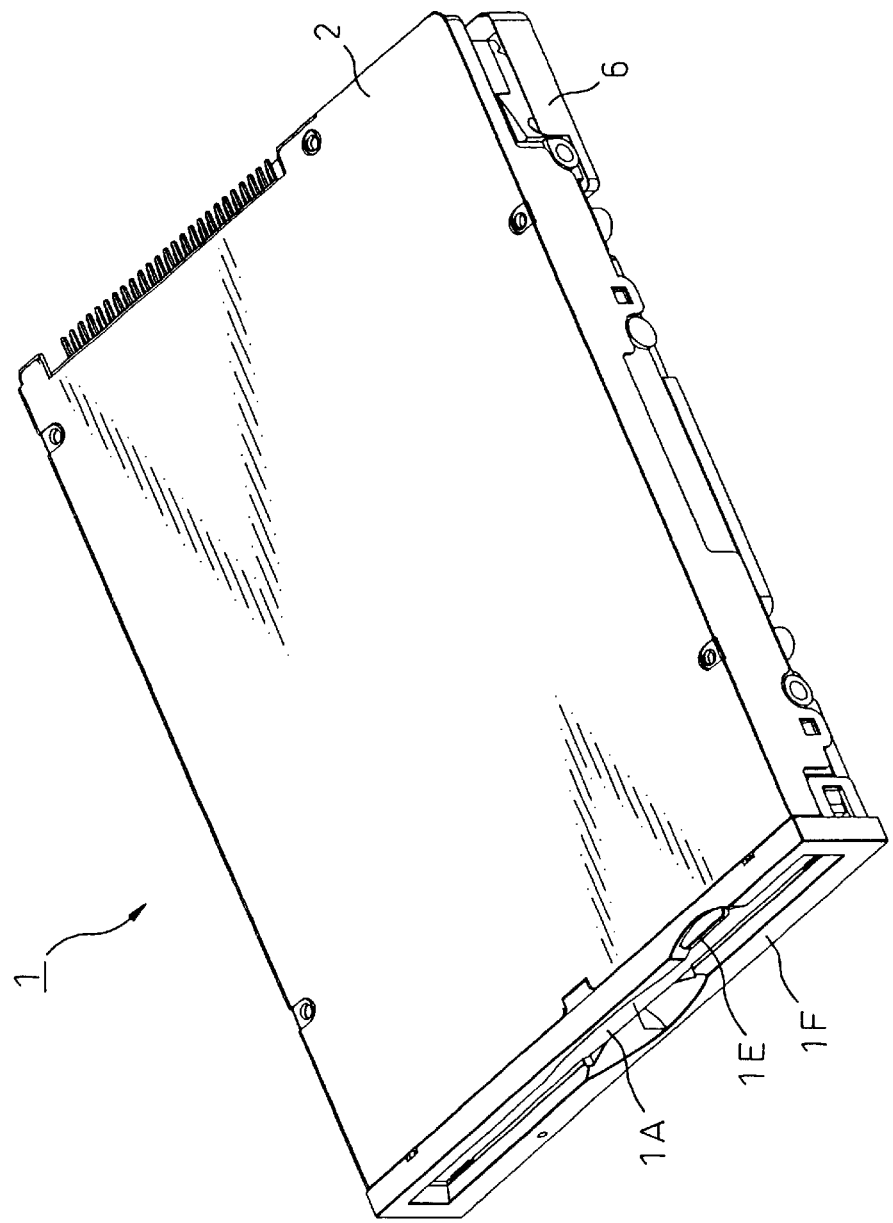
FIG. 1 is a perspective drawing showing the appearance of a whole optical disk drive in accordance with the present invention seen from the top thereof.

FIG. 1 is a top view of a whole optical disk drive 1 in accordance with an embodiment of the present invention. An insertion port 1A for an optical disk cartridge and a front panel 1F having an eject button 1E, which is used to eject an optical disk cartridge from the disk drive, are formed on the front side of the optical disk drive 1. In the present embodiment, the optical disk drive 1 has a top cover 2 and a bottom cover 6.

Figure 2:
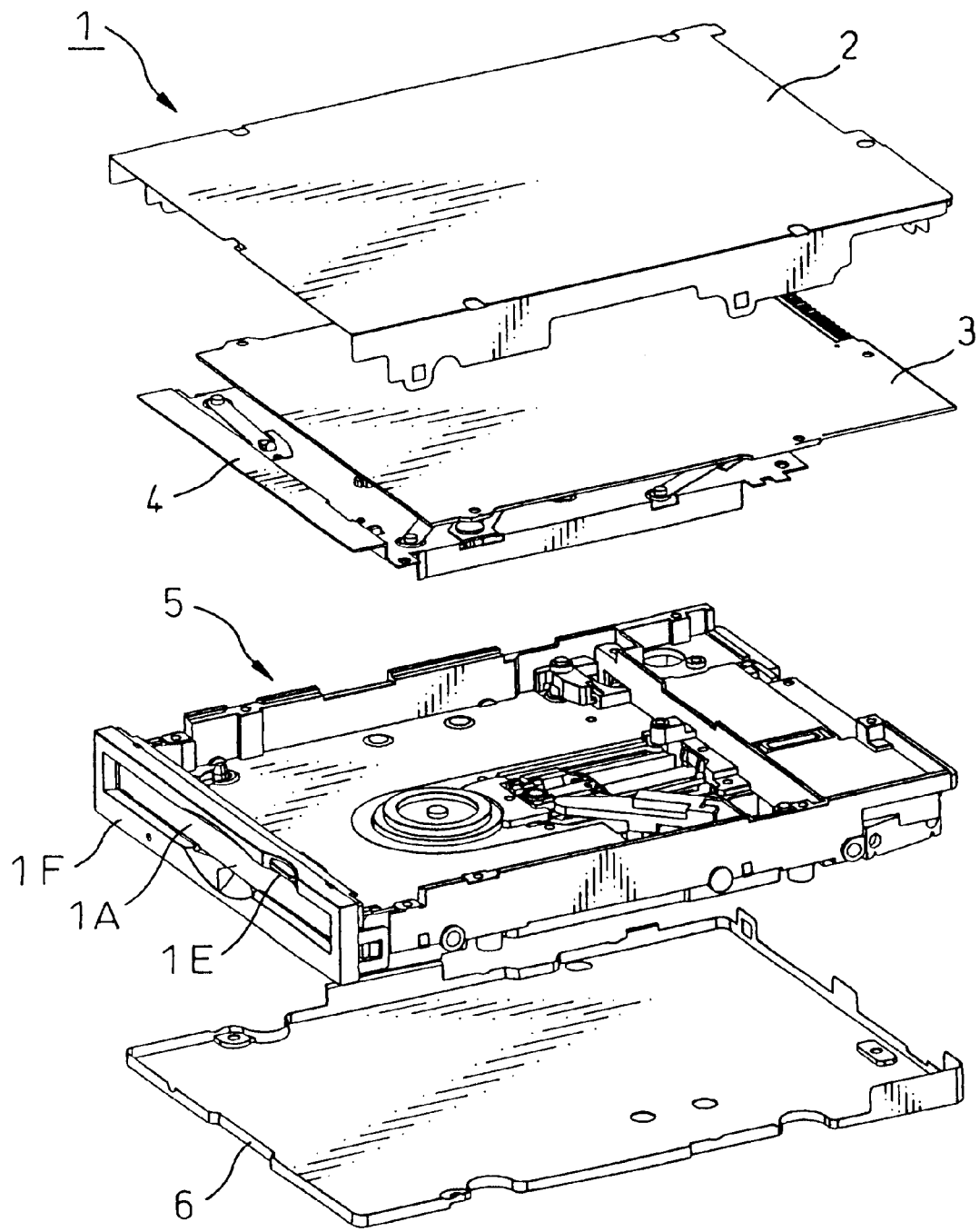
FIG. 2 is an exploded perspective drawing showing the structure of the optical disk drive, which is shown in FIG. 1, seen from the top thereof.
Figure 3:
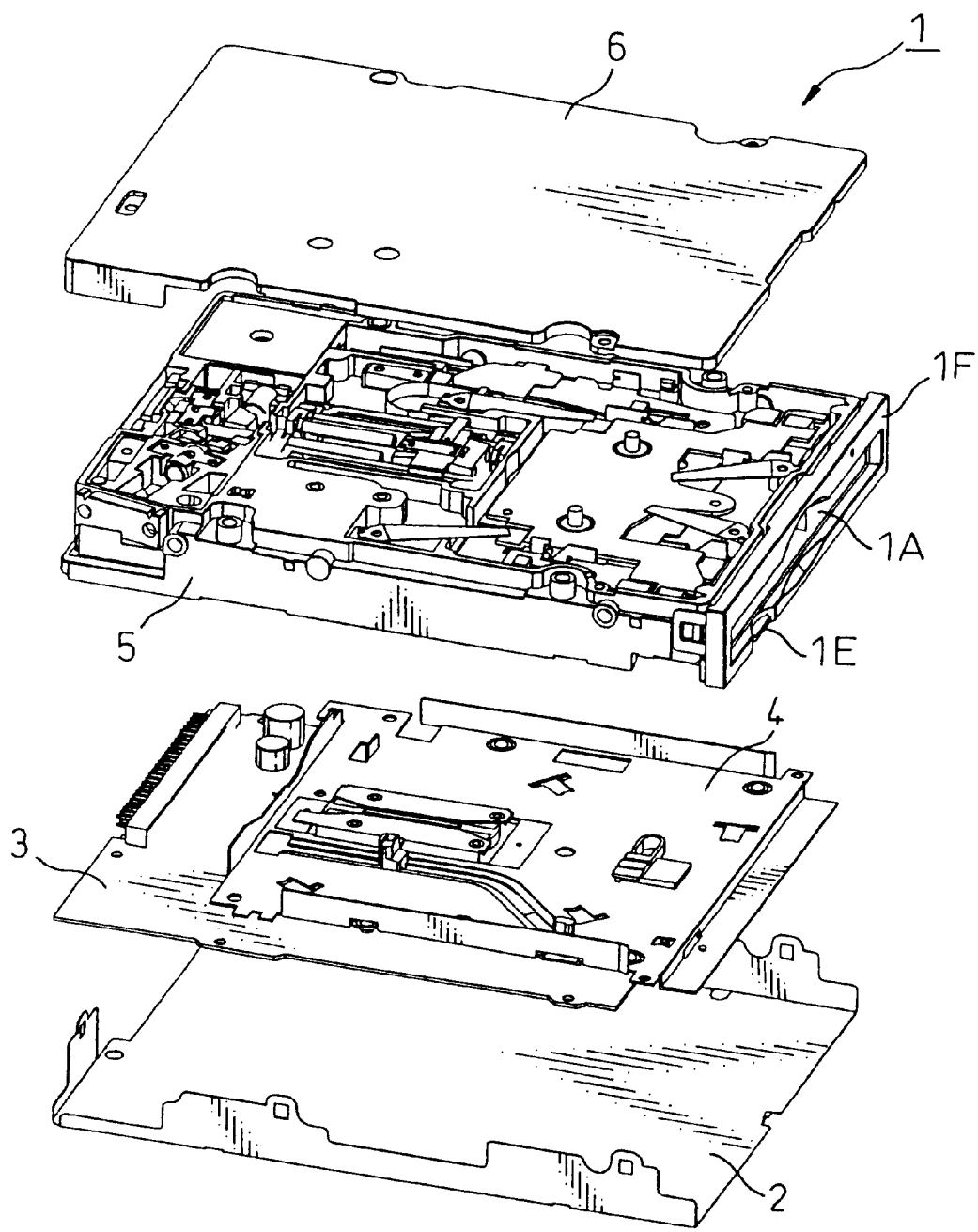
FIG. 3 is an exploded perspective drawing showing the structure of the optical disk drive, which is shown in FIG. 1, seen from the bottom thereof.

FIG. 2 is a top view showing disassembled components of the optical disk drive 1 shown in FIG. 1. FIG. 3 is a bottom view showing the disassembled components of the optical disk drive 1 shown in FIG. 1. In the present embodiment, a printed-circuit board 3, a cartridge holder assembly 4, and a main body 5 are interposed between the top cover 2 and bottom cover 6 and arranged in that order beneath the top cover 2. The front panel 1F having the insertion port 1A and Eject button 1E is attached to the main body 5. FIG. 2 and FIG. 3 show the overall structure of the optical disk drive in accordance with the present invention. Individual components required for the present invention will be described later.

Figure 4:
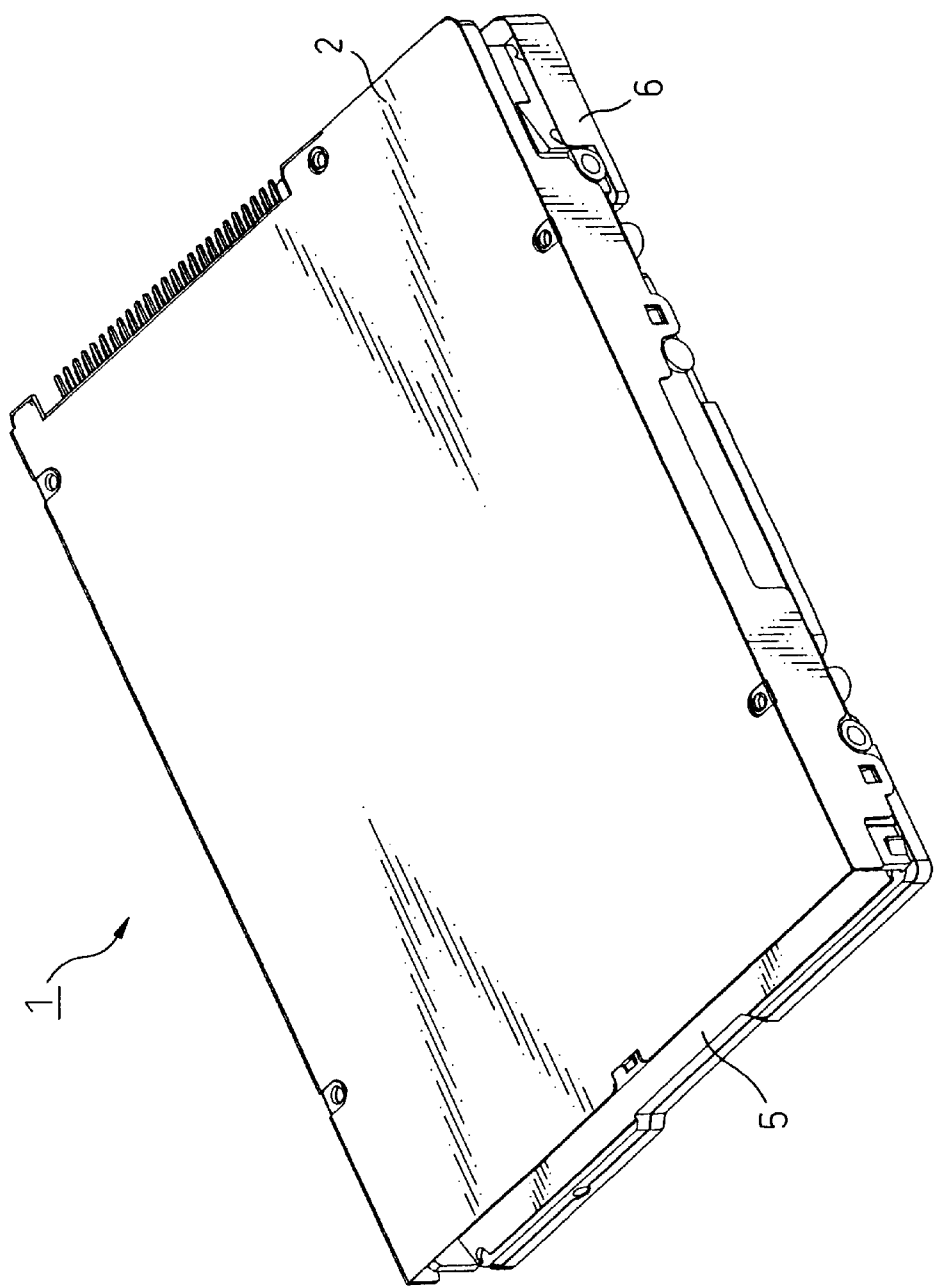
FIG. 4 is a perspective drawing showing the optical disk drive, which is shown in FIG. 1, with a front panel removed therefrom.
Figure 5:
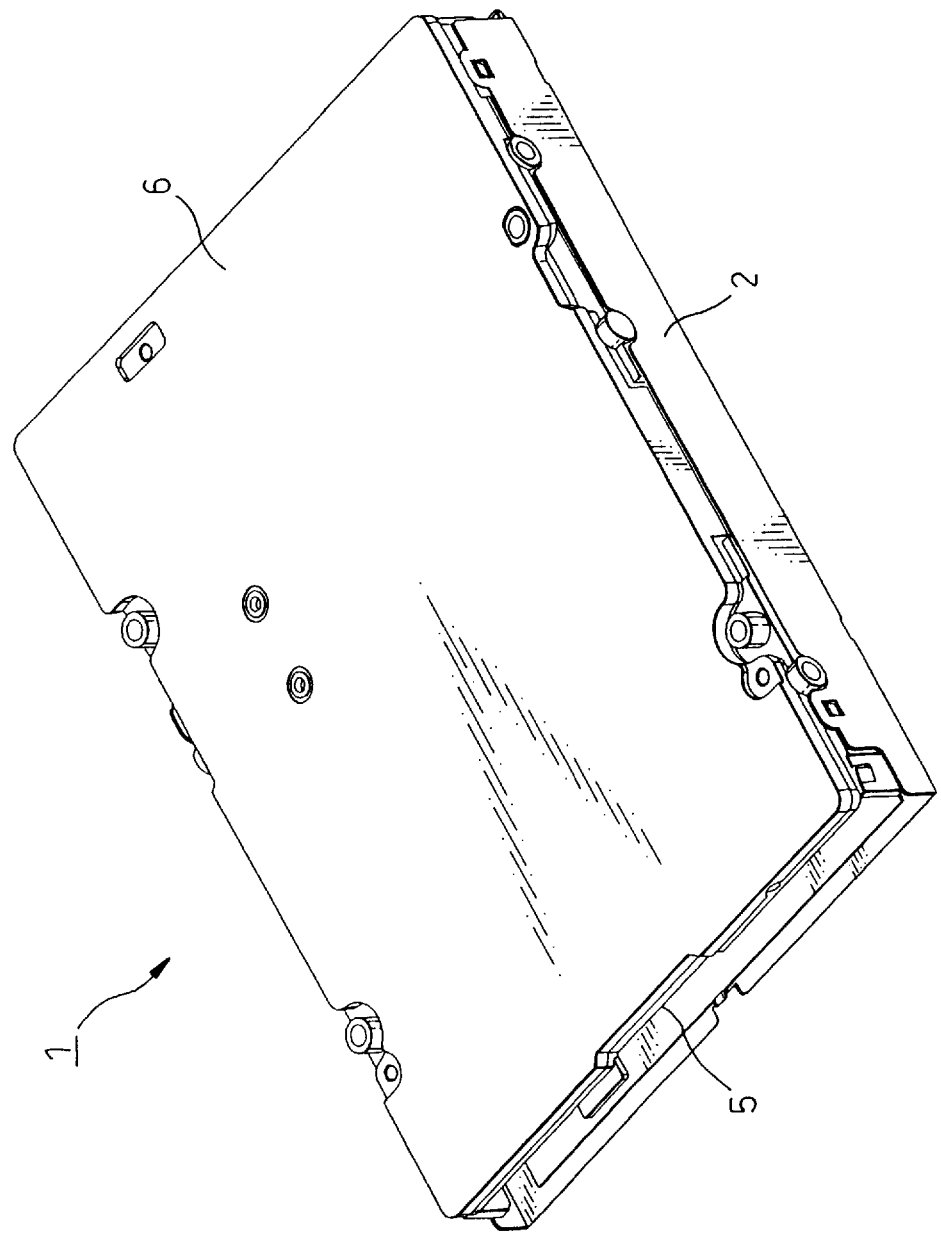
FIG. 5 is a perspective drawing showing the optical disk drive, which is shown in FIG. 4, seen from the bottom thereof.

FIG. 4 shows the optical disk drive 1 shown in FIG. 1 with the front panel 1F removed therefrom. Part of the main body 5 interposed between the top cover 2 and bottom cover 6 is seen to lie behind the front panel 1F. FIG. 5 shows the optical disk drive 1 shown in FIG. 4 as seen from the bottom thereof.

Figure 6:
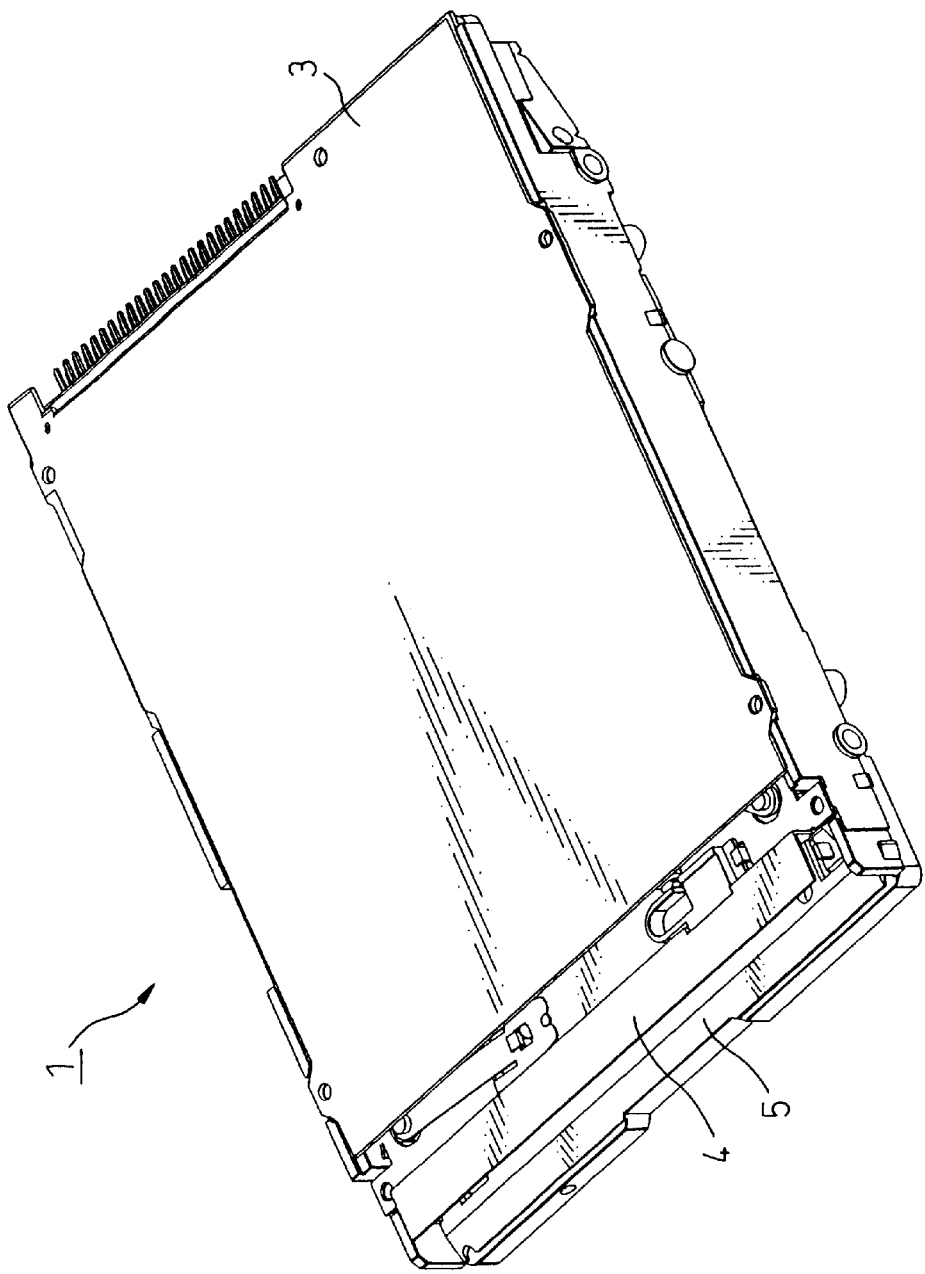
FIG. 6 is a perspective drawing showing the optical disk drive, which is shown in FIG. 4, with a top cover and bottom cover removed therefrom.

FIG. 6 shows the optical disk drive 1 shown in FIG. 4 with the top cover 2 and bottom cover 6 removed therefrom. As apparent from the drawing, the cartridge holder assembly 4 is placed on the main body 5 of the optical disk drive 1, and the printed-circuit board 3 is placed on the cartridge holder assembly 4.

Figure 7:
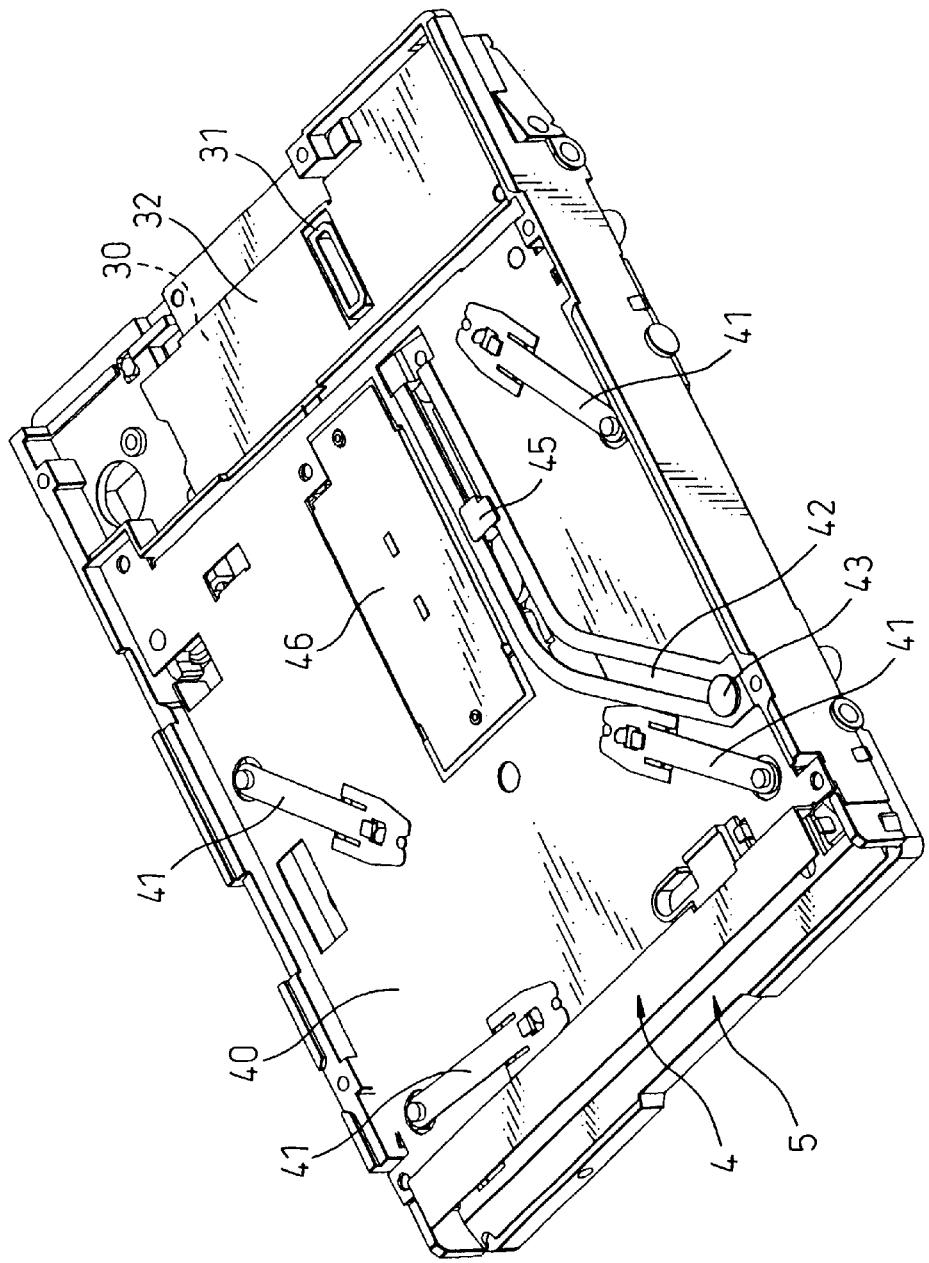
FIG. 7 is a perspective drawing showing the optical disk drive, which is shown in FIG. 6, with a printed-circuit board removed therefrom.
Figure 8:
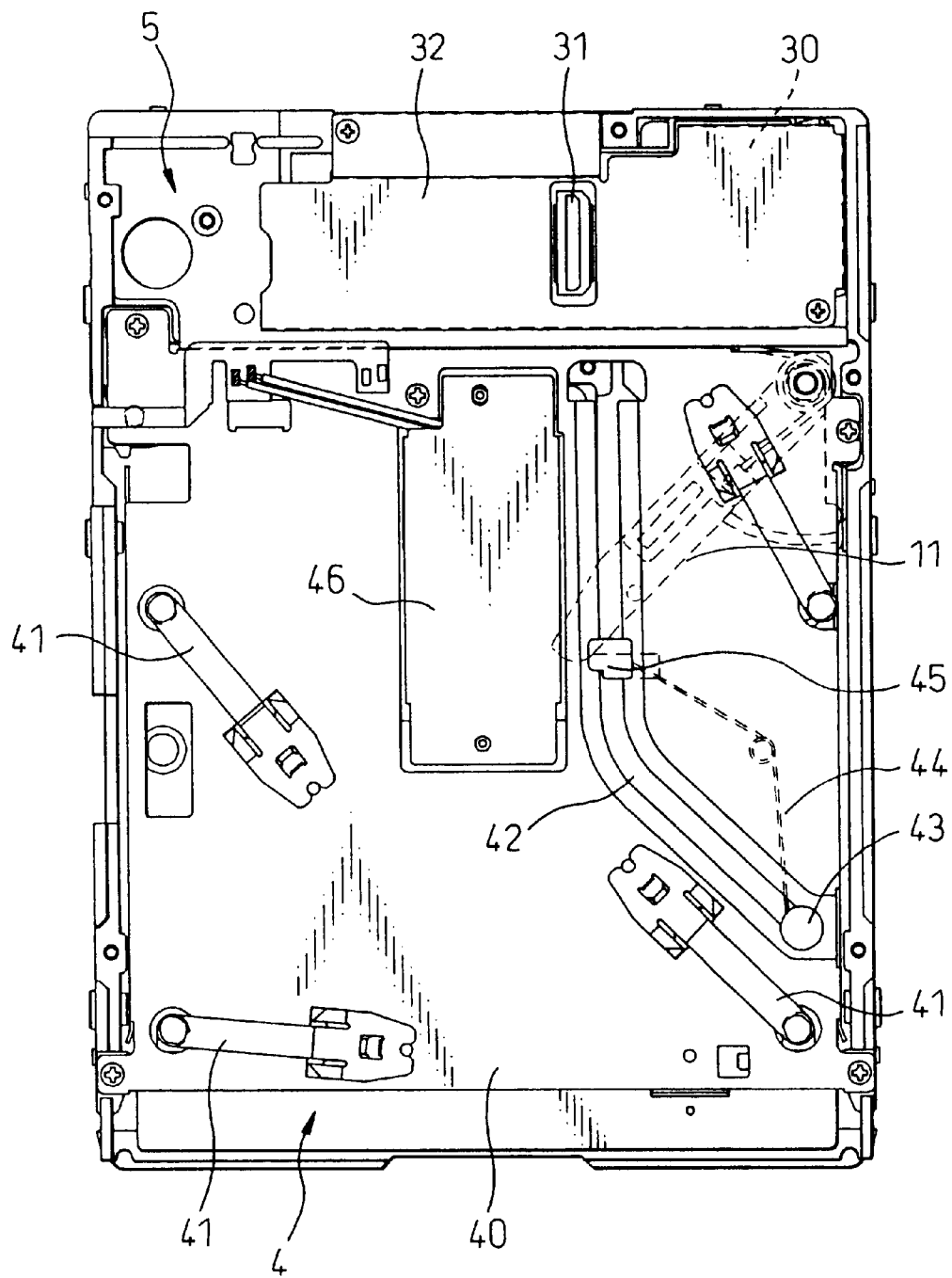
FIG. 8 is a plan view of the optical disk drive shown in FIG. 7.

FIG. 7 shows the optical disk drive 1 shown in FIG. 6 with the printed-circuit board 3 removed therefrom. FIG. 8 is a plan view of the optical disk drive 1 shown in FIG. 7. As seen from these drawings, the cartridge holder assembly 4 placed on the main body 5 has a cartridge holder 40 covering the top of a portion of the main body 5 in which an optical disk cartridge is inserted. The cartridge holder 40 has cartridge pressers 41, a first shutter opening/closing piece 43, a second shutter opening/closing piece 45, a guide groove 42, a torsion spring 44, and a bias magnet assembly 46. The cartridge pressers 41 press the optical disk cartridge, which is inserted into the main body 5, from above. The first and second shutter opening/closing pieces 43 and 45 are used to open the shutter of an optical disk cartridge inserted in the main body 5. The torsion spring 44 is laid between the first and second shutter opening/closing pieces 43 and 45. The bias magnet assembly 46 generates a magnetic field necessary to write data in a disk encapsulated in an optical disk cartridge. A member indicated with a dashed line near the second shutter opening/closing piece 45 in FIG. 8 is an ejection arm 11 to be described later.

A printed-circuit board 30 having a connector 31 formed thereon is located on the main body 5 adjacent to the cartridge holder assembly 4. The printed-circuit board 30 is covered with a metallic shield 32. The connector 31 of the printed-circuit board 30 is mated with a connector (not shown) formed on the printed-circuit board 3 described in conjunction with FIG. 6 when the printed-circuit board 3 is placed on the main body 5.

Figure 9:
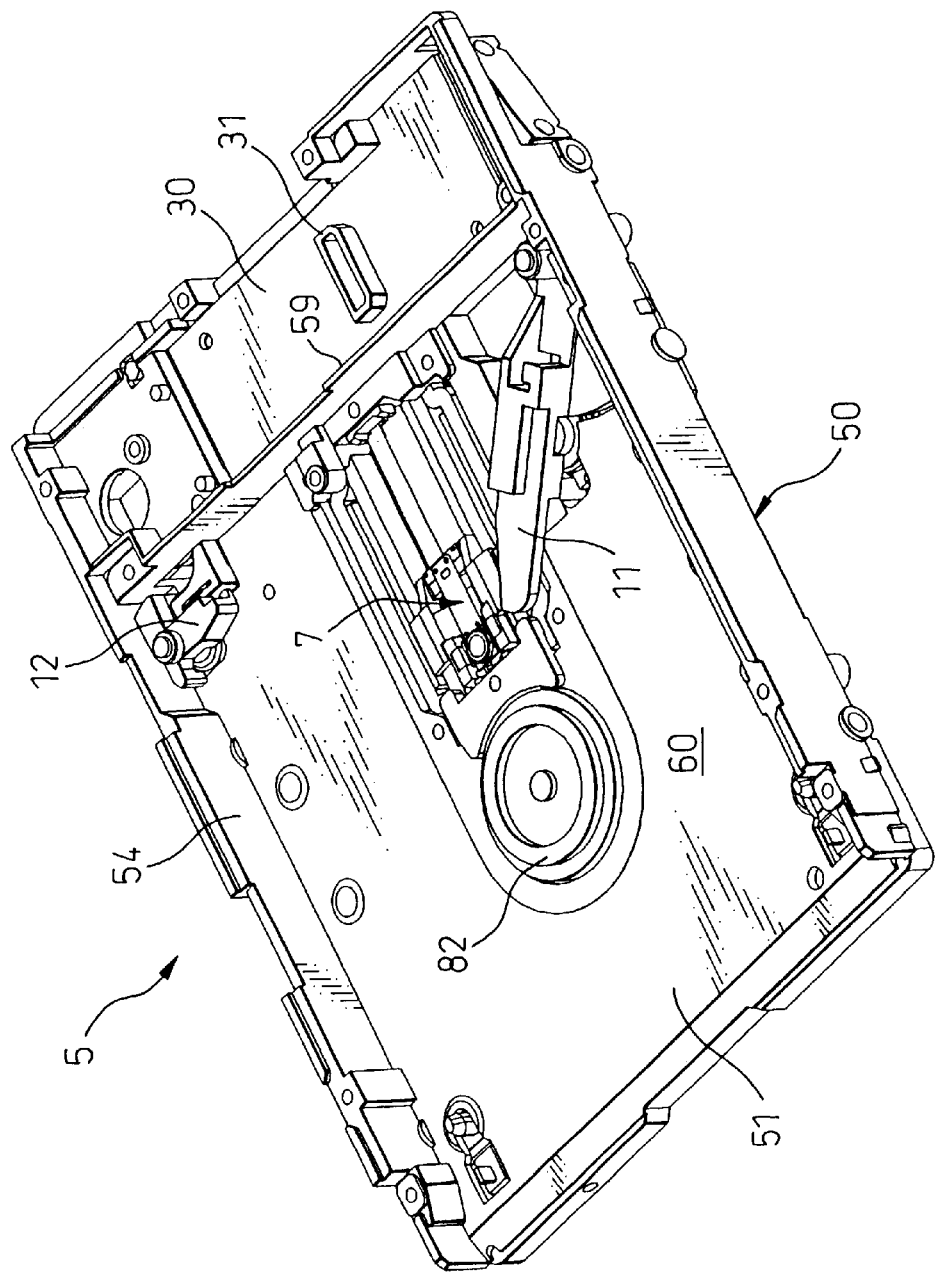
FIG. 9 is a perspective drawing showing a main body shown in FIG. 7 with a cartridge holder assembly and a shield for a printed-circuit board removed therefrom.

FIG. 9 shows the main body 5 shown in FIG. 7 with the cartridge holder assembly 4 and the shield 32 for the printed-circuit board 30 removed therefrom. A base 51 of a chassis 50 of the main body 5 has sidewalls 54 formed on both edges in the longitudinal direction of the main body. A partition wall 59 linking the sidewalls 54 is formed orthogonally to the sidewalls 54. The partition wall 59 is located at a farther position than the center of the base 51, that is, at a position far away from the side of the main body (on the left-hand side of the drawing) on which an optical disk cartridge is inserted. One side of the main body is left open. An area on the base 51 surrounded by the two sidewalls 54 and partition wall 59 serves as an optical disk cartridge stowage 60 in which an optical disk cartridge is stowed.

A turntable 82 attached to the rotation shaft of a spindle motor is bared in the center of the optical disk cartridge stowage 60 while not projecting from the face of the base 51. The movable optical unit 7 is located behind the turntable 82. When an optical disk cartridge is inserted in the optical disk cartridge stowage 60, the shutter of the optical disk cartridge is opened. At this time, the turntable 82 is thrust into the optical disk cartridge and chucked to the hub of an optical disk. The optical disk is then rotated. The movable optical unit 7 has a carriage that moves in the radial direction of the optical disk rotated by the turntable 82. Laser light is irradiated to a recording track on the optical disk through an object lens mounted in the carriage, whereby data is read or written from or in the optical disk. The laser light is propagated from the stationary optical unit to be described later to the movable optical unit. The movable optical unit 7 has no direct relation to the constituent features of the present invention. The description of the structure and operation of the movable optical unit 7 will be omitted.

The ejection arm 11 and timing arm 12 are located at the sides of the movable optical unit 7 in the optical disk cartridge stowage 60. The ejection arm 11 pivots, with a rotation shaft as a fulcrum, whereby an optical disk cartridge stowed in the optical disk cartridge stowage 60 is ejected out of the base. When the eject button described in conjunction with FIG. 1 and others is pressed, an ejection motor that is not shown is rotated. This causes the ejection arm 11 to pivot to move a sheet loader. Consequently, the optical disk cartridge is ejected. The timing arm 12 also pivots with a rotation shaft as a fulcrum. The timing arm 12 is actuated at the timing of an optical disk cartridge's being fully stowed in the optical disk cartridge stowage 60. The timing arm 12 causes the turntable 82 to be chucked to the hub of an optical disk. The movement of the timing arm 12 will be described later.

The printed-circuit board 30 having the connector 31 formed thereon and a control IC and others, which are not shown, mounted thereon is placed in a narrower area on the base 51 defined by the partition wall 59. The stationary optical unit is placed on the surface of the chassis 50 opposite to the printed-circuit board 30. The printed-circuit board 30 is connected to a sensor, which will be described later, included in the stationary optical unit over a flexible printed-circuit board (FPC).

Figure 10:
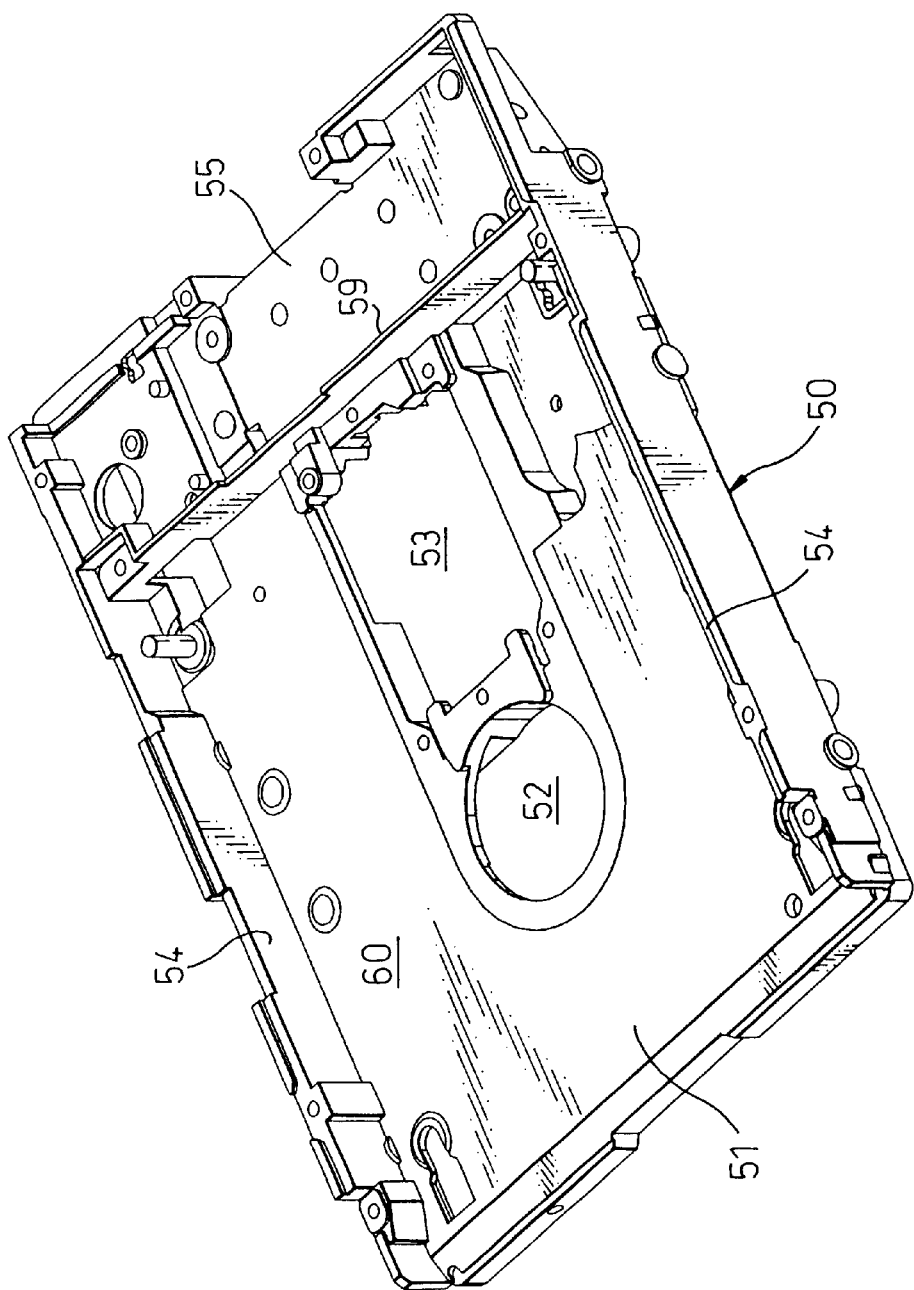
FIG. 10 is a perspective drawing showing the structure of a chassis of the main body of the optical disk drive in accordance with the present invention seen from the top thereof.
Figure 11:
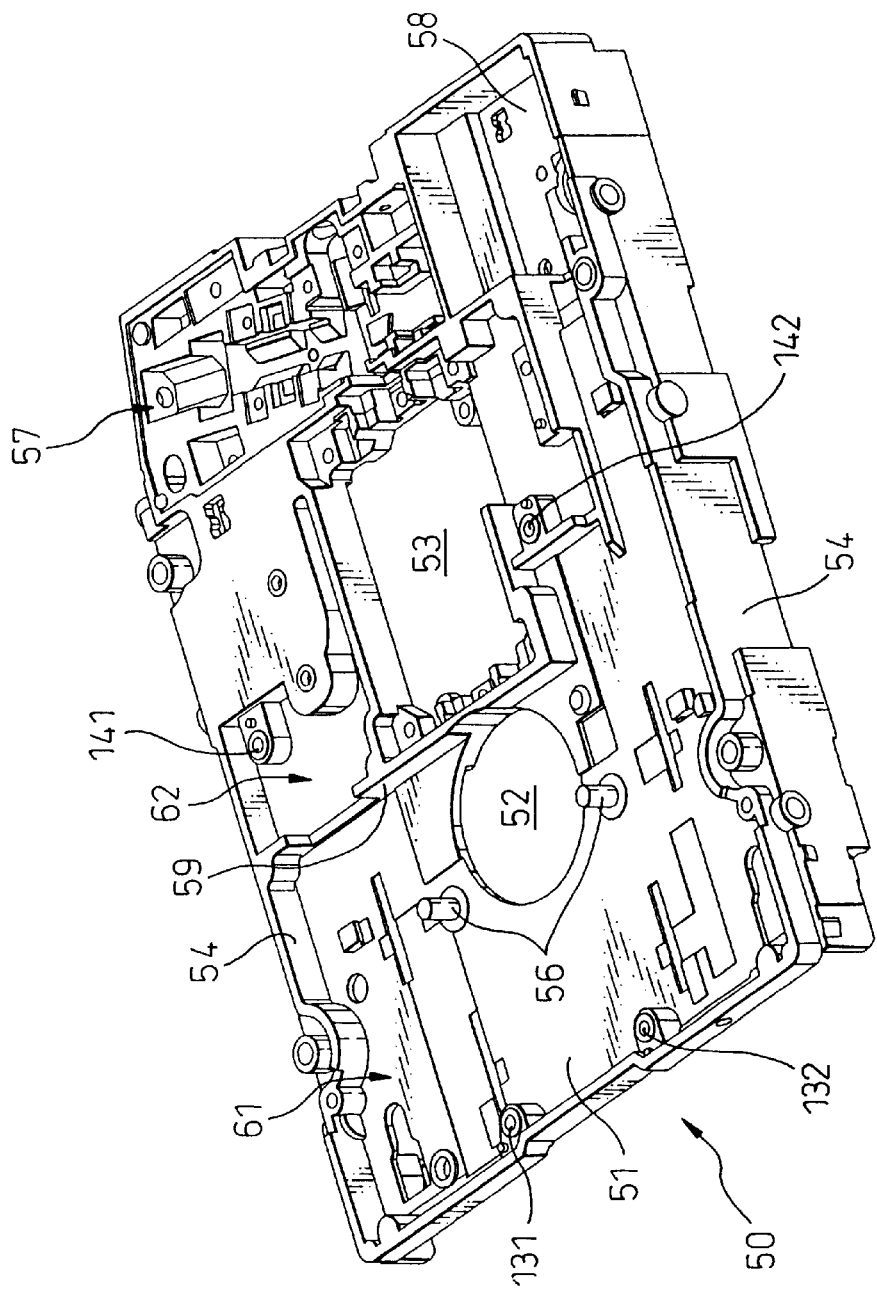
FIG. 11 is a perspective drawing showing the structure of the chassis of the main body of the optical disk drive in accordance with the present invention seen from the bottom thereof.

The structure of the chassis 50 having all components removed therefrom will be described in conjunction with FIG. 10 and FIG. 11. FIG. 10 shows the chassis 50 seen from the top cover (the top of the chassis). FIG. 11 shows the chassis 50 seen from the bottom cover (the bottom of the chassis). To begin with, the top of the base 51 of the chassis 50 will be described. The top is, as mentioned above, partitioned into a wide area and a narrow area by the partition wall 59. The wide area serves as the optical disk cartridge stowage 60, while the narrow area serves as a board-mounting section 55.

A round hole 52 for the spindle motor is bored substantially in the center of the optical disk cartridge stowage 60. A hole 53 for the movable optical unit is bored adjacently to the hole 52 between the hole 52 and partition wall 59. The turntable 82 of the spindle motor is, as shown in FIG. 9, positioned in the round hole 52 for the spindle motor. The movable optical unit 7 is, as shown in FIG. 9, fitted in the hole 53 for the movable optical unit. The printed-circuit board 30 is, as shown in FIG. 9, mounted on the board-mounting section 55.

Next, the bottom of the base 51 of the chassis 50 will be described. The sidewalls 54 are formed in the longitudinal direction on the bottom of the chassis 50. The bottom is partitioned into four areas by the partition wall 59. An area adjoining an entrance of an optical disk cartridge (on the left-hand side of the drawing) serves as a spindle motor assembly storage 61. A subsequent area serves as a movable optical unit stowage 62. An area farthest from the entrance for an optical disk cartridge is partitioned into two subareas. One of the subareas serves as the stationary optical unit 57, while the other subarea serves as an ejection motor stowage 58.

The spindle motor assembly stowage 61 has the hole 52 for the spindle motor and posts 56 used to lift or lower the spindle motor assembly. Attachment blocks having attachment holes 131 and 132 used to attach blade springs 13 to be described later are formed on a side of the spindle motor assembly stowage 61 acting as the entrance for an optical disk cartridge. The hole 53 for the movable optical unit and attachment blocks having attachment holes 141 and 142 used to attach blade springs 14, to be described later, are formed in the movable optical unit stowage 62. The tops of the attachment blocks having the attachment holes 131, 132, 141, and 142 are lower in height than the apical surfaces of the sidewalls 53 and partition wall 59. The stationary optical unit 57 is die-cast to have dents and blocks formed therein so that various optical elements can be incorporated in the stationary optical unit 57. The ejection motor stowage 58 accommodates an ejection motor used to bring the sheet loader 9, which has been described in conjunction with FIG. 9, to an unloaded state.

Figure 12:
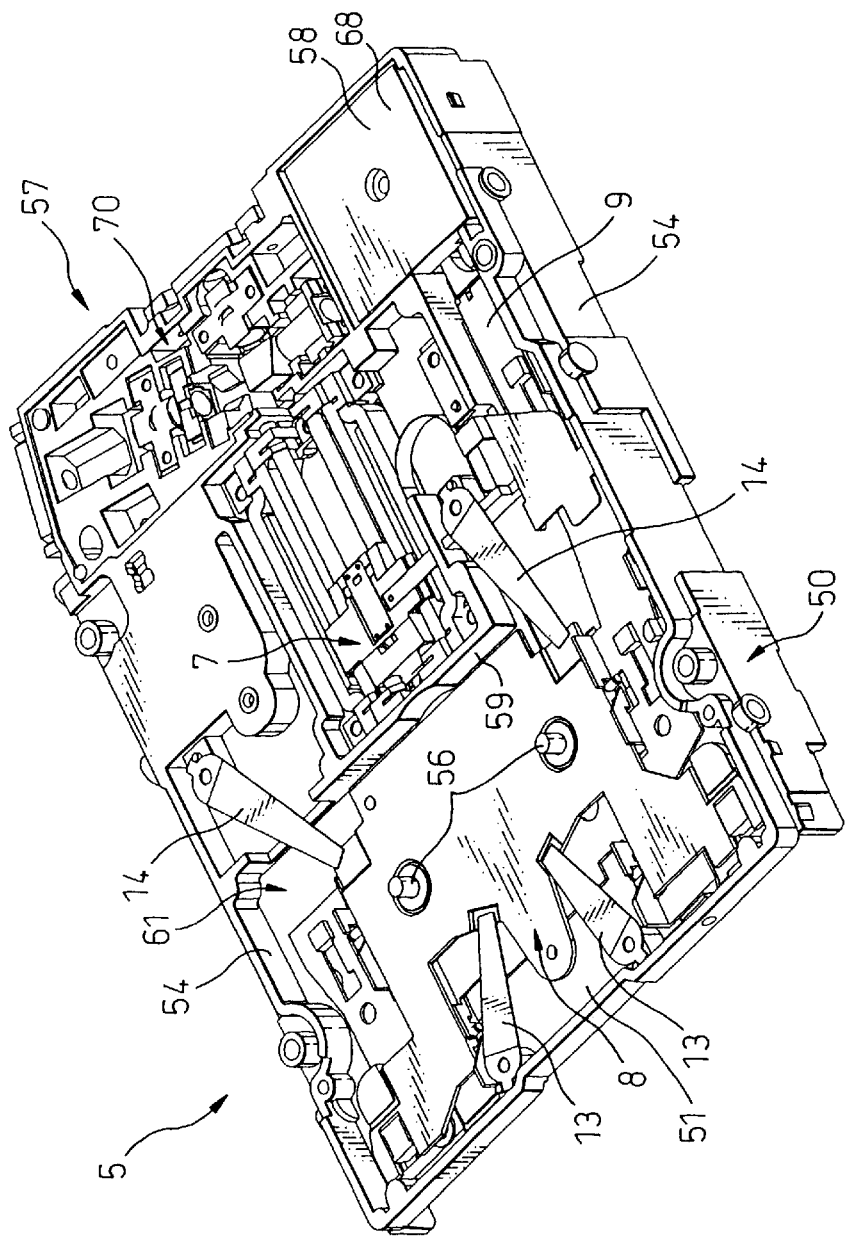
FIG. 12 is a perspective drawing showing the chassis shown in FIG. 11 with major components including a stationary optical unit, a movable optical unit, and a spindle motor assembly mounted thereon.

FIG. 12 shows the main body 5, as seen from the bottom thereof, having major components mounted on the chassis 50 shown in FIG. 11. The sheet loader 9 and spindle motor assembly 8 are stowed in the spindle motor assembly stowage 61 enclosed with the sidewalls 54 and partition wall 59. The spindle motor assembly 8 has the posts 56 penetrated through it. The spindle motor assembly 8 is constrained to move towards the base 51 by the first blade springs 13 attached using the attachment holes 131 and 132 shown in FIG. 11, and the second blade springs 14 attached using the attachment holes 141 and 142. The movable optical unit 7 is placed in the movable optical unit stowage 62 adjoining the spindle motor assembly stowage 61. A plurality of optical elements is integrated into the stationary optical unit 57, whereby a stationary optical assembly 70 is constructed. Furthermore, the ejection motor 68 is stowed in the ejection motor stowage 58.

Figure 13A:
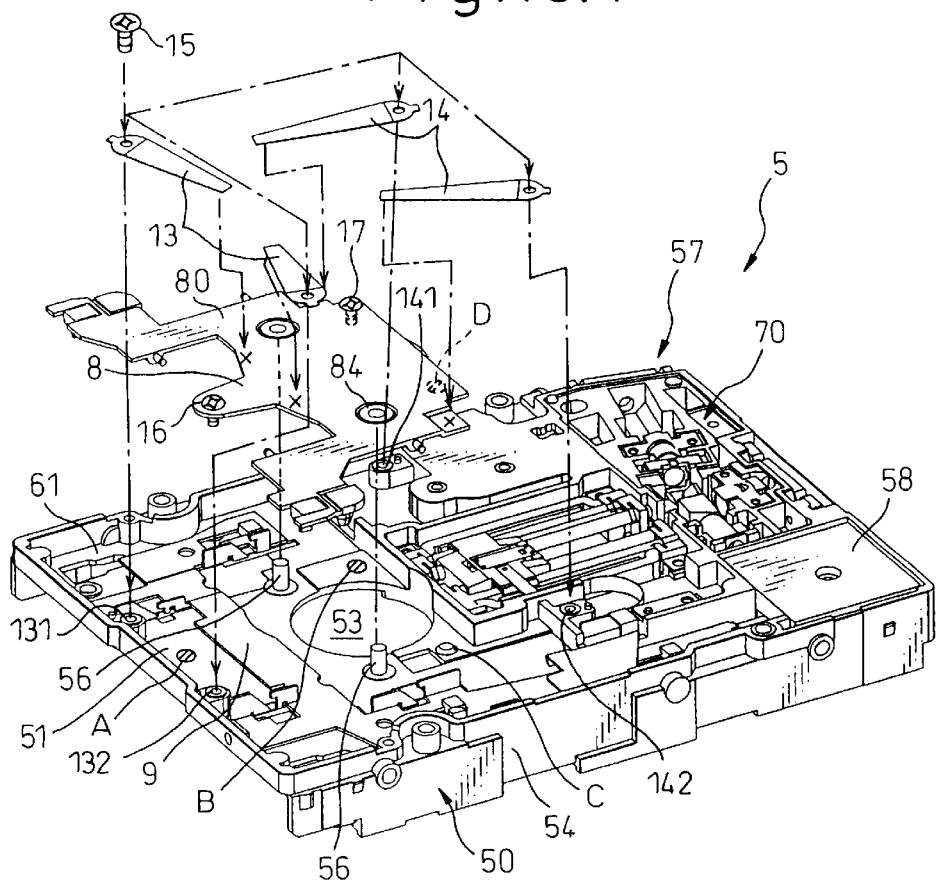
FIG. 13A is an exploded perspective view showing mounting of the spindle motor assembly in the main body shown in FIG. 12.

FIG. 13A shows attachment of the spindle motor assembly 8 to the main body 5 shown in FIG. 12. For attaching the spindle motor assembly 8, after the sheet loader 9 is put in the spindle motor assembly stowage 61, the posts 56 projecting from the base 51 are penetrated through guide portions 84 bored in the lift plate 80. At this time, the spindle motor placed on the face (the lower side of the lift plate 80 in the drawing) of the lift plate 80 is penetrated through the hole 53.

The lift plate 80 has its tilt relative to the base 51 adjusted at three points with the spindle motor jutted out of the hole 53. A first tilt adjustment screw 16 and a second tilt adjustment screw 17 are disposed at two out of the three points. The remaining point D on the lift plate 80 serves as a height level. When the posts 56 are penetrated through the lift plate 80 and the spindle motor is jutted out of the hole 53, the tip of the first tilt adjustment screw 16 abuts on a screw abutment plane A on the base 51. The tip of the second tilt adjustment screw 17 abuts on a screw abutment plane B on the base 51. The height level D on the lift plate 80 abuts on a level C of a reference projection projected from the base 51 when the posts 56 are penetrated through the lift plate 80.

Figure 13B:
FIG. 13B and FIG. 13C are a side view and plan view of a blade spring for constraining the spindle motor assembly to move.
Figure 13D:
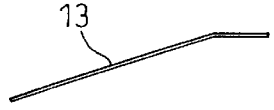
FIG. 13D and FIG. 13E are a side view and plan view of another blade spring for constraining the spindle motor assembly to move.
Figure 13C:
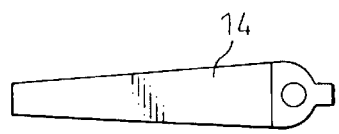
Figure 13E:
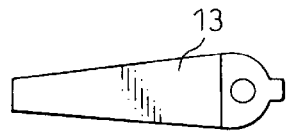

When the posts 56 are penetrated through the lift plate 80, the spindle motor assembly 8 is stowed in the spindle motor assembly stowage 61 of the chassis 50. At this time, the second blade springs 14 shown in FIG. 13B and FIG. 13C have holes thereof aligned with the attachment holes 141 and 142 bored in the chassis 50, and are secured by screws 15. The first blade springs 13 shown in FIG. 13D and FIG. 13E have holes thereof aligned with the attachment holes 131 and 132 bored in the chassis 50, and are secured by screws 15. As shown in FIG. 13B and FIG. 13D, the first and second blade springs 13 and 14 are bent in order to exert predetermined constraining force. When the proximal ends of the first and second blade springs 13 and 14 are fixed to the base 51 using the screws 15, the lift plate 80 is constrained to move towards the base by the distal ends of the blade springs 13 and 14.

When an optical disk cartridge is fully inserted in a space opposite to the spindle motor assembly stowage 61, the spindle motor is jutted out of the hole 53. At this time, a force causing the optical disk cartridge to be ejected is exerted by the ejection arm 11 and timing arm 12. Consequently, a strong force causing the lift plate 80 to separate from the base 51 works on the entrance-side part of the lift plate 80. In the present embodiment, the constraining force exerted by the first blade springs 13 is stronger than that exerted by the second blade springs 14.

For adjusting the tilt of the lift plate 80 relative to the base 51, the tip of the first tilt adjustment screw 16 is abutted on the screw abutment plane A on the base 51. Moreover, the tip of the second tilt adjustment screw 17 is abutted on the screw abutment plane B on the base 51, and the height level B on the lift plate 80 is abutted on the level C on the reference projection projected from the base 51. In other words, after the height level D on the lift plate 80 is abutted on the level C of the reference projection projected from the base 51, the first tilt adjustment screw 16 and second tilt adjustment screw 17 are adjusted to abut the screw abutment planes. Thus, the tilt of the lift plate 80 relative to the base 51 is adjusted. After the tilt of the lift plate 80 relative to the base 51 is adjusted, the first tilt adjustment screw 16 and second tilt adjustment screw 17 are immobilized.

Figure 14:
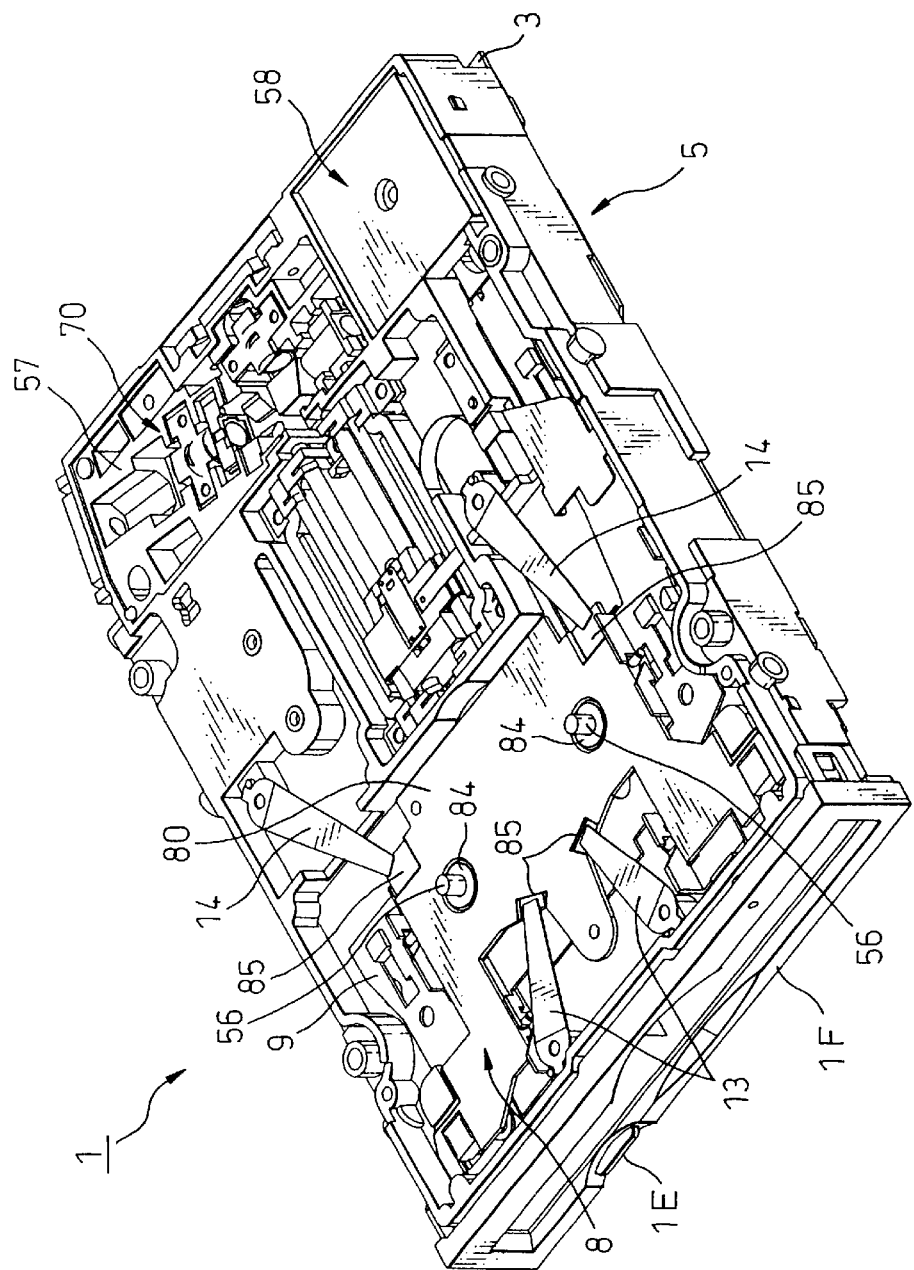
FIG. 14 is a perspective drawing showing the optical disk drive, which is seen from the bottom thereof, with the front panel, cartridge holder assembly, and printed-circuit board mounted in the main body thereof shown in FIG. 12.

FIG. 14 shows the main body 5 shown in FIG. 12 with the front panel 1F, cartridge holder assembly, and printed-circuit board 3 mounted thereon after the completion of adjustment of the tilt of the lift plate 80 relative to the base 51. As seen from the drawing, the tips of the blade springs 13 and 14 for constraining the spindle motor assembly 8 to move towards the base are engaged with spring receiving concave parts 85 formed in the lift plate 80. This is intended to prevent parts of the lift plate 80, to which constraining force is applied, from being changed.

Figure 15:
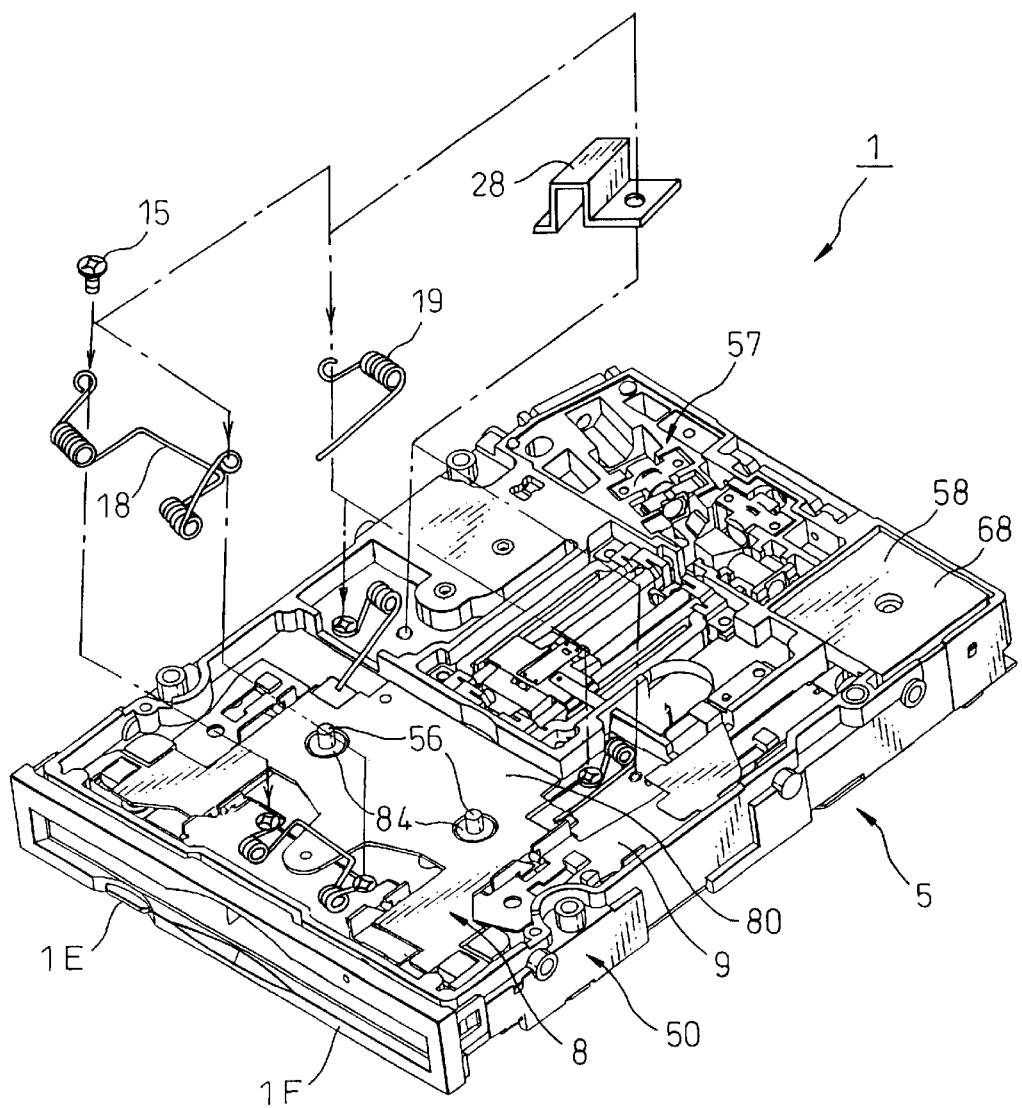
FIG. 15 is a perspective drawing showing the optical disk drive shown in FIG. 14 with twisted coil springs substituted for the blade springs.

FIG. 15 shows an example of the main body 5 shown in FIG. 14 in which twisted coil springs 18 and 19 are substituted for the blade springs 13 and 14. The twisted coil springs 18 and 19 are fixed to the chassis 50 using the screws 15. The twisted coil springs 18 and 19 are located at positions at which substantially the same constraining force as that exerted by the blade springs 13 and 14 is exerted by the twisted coil springs and operated on the lift plate 80. In this example, the twisted coil spring 18 is formed with two twisted coils that are joined, and constrains the center tongue portion of the lift plate 80 to move towards the base. The twisted coil springs 19 are two independent springs. Since a joint of each twisted coil spring 19 and the lift plate 80 is almost a pinpoint, the twisted coil springs 19 are shielded with covers 28 for fear the constraining points on the lift plate may shift.

Points on the lift plate 80 into which the blade springs 13 and 14 or twisted coil springs 18 and 19 are brought into contact may be located near the joint of the lift plate 80 and chassis 50. The blade springs 13 and 14 or twisted coil springs 18 and 19 may be brought into contact with points on the lift plate near the joint of the lift plate and chassis, thus constraining the lift plate to move towards the chassis 50.

The spindle motor assembly 8 is constrained to move towards the chassis using the blade springs 13 and 14 or twisted coil springs 18 and 19. This is because the height of the optical disk drive 1 in accordance with the present invention is limited. The springs are used to prevent the height of the optical disk drive 1 from increasing. In contrast, when the height of the optical disk drive 1 is large enough, an independent coil spring could be brought into contact with a point near the center of the lift plate 80 coincident with the center of gravity of the spindle motor assembly 8. The lift plate 80 could thus be constrained to move towards the chassis. In this case, the point near the center of the lift plate 80 should be coincident with the center of gravity of the lift plate 80 or a geometrical center of gravity that is the joint of the lift plate 80 and chassis 50.

Figure 16A:
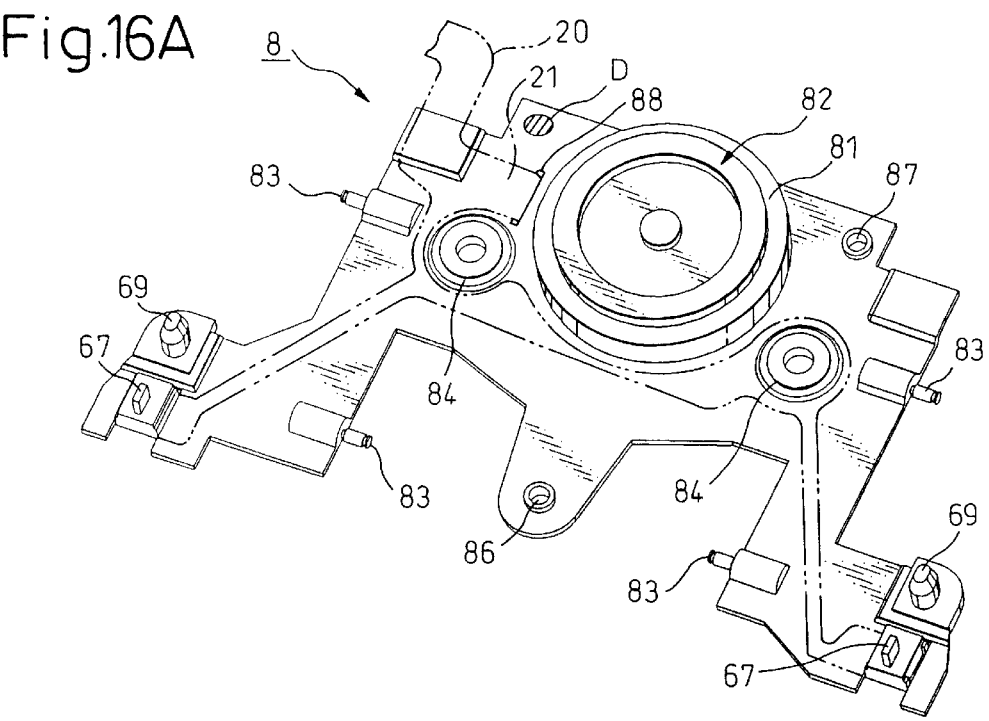
FIG. 16A is a perspective drawing showing the structure of the spindle motor assembly employed in the optical disk drive in accordance with the present invention.
Figure 16B:
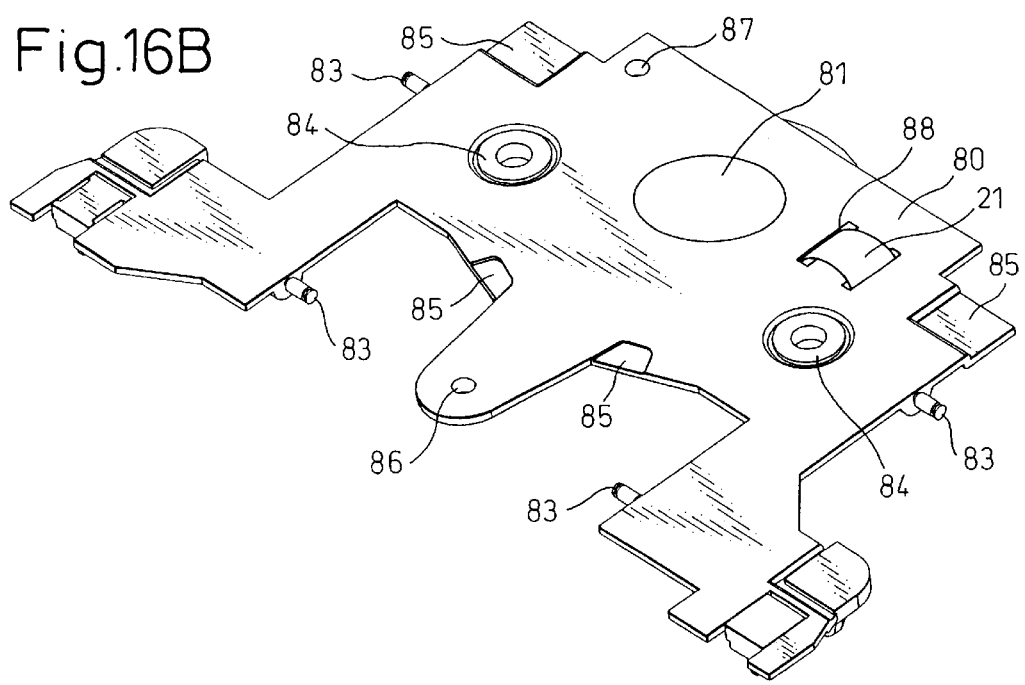
FIG. 16B is a perspective drawing showing the spindle motor assembly, which is shown in FIG. 16A, seen from below.

FIG. 16A and FIG. 16B show the structure of the spindle motor assembly 8 employed in the optical disk drive 1 in accordance with the present invention. FIG. 16A shows the spindle motor assembly 8 seen from the spindle motor-mounted side (face) thereof. FIG. 16B shows the spindle motor assembly 8 seen from the bottom thereof.

The lift plate 80 that is a major component of the spindle motor assembly 8 has a detection switch 67, two alignment pins 69, the spindle motor 81, the guide portions 84, the flexible printed-circuit board (FPC) 20, four side pins 83, the first and second adjustment screw holes 86 and 87, and slits 88. The detection switch 67 is used to detect the position of a write protector tab when an optical disk cartridge is landed on the base. When the lift plate 80 is lifted to reach the back of the base, the two alignment pins 69 are jutted to the passage of an optical disk cartridge on the base 51, and fitted into oblong reference holes bored in the optical disk cartridge. The spindle motor 81 has the turntable 82 that is chucked to the hub of an optical disk. The guide portions 84 guide the lift plate 80 when the lift plate 80 is lifted or lowered. The four side pins 83 help lift or lower the lift plate 80. The first and second tilt adjustment screws described in conjunction with FIG. 13 are fitted into the first and second adjustment screw holes 86 and 87. A coil-coupled portion 21 of the flexible printed-circuit board 20 is passed through the slits 88. D denotes the height level.

The two slits 88 are, as shown in FIG. 16B, bored in the lift plate 80. The coil-coupled portion 21 of the flexible printed-circuit board 20 is passed through the two slits 88 and returned to the face of the lift plate 80 will be described below. The lift plate 80 has the four spring receiving concave parts 85 formed for accommodating the distal ends of the blade springs 13 and 14 described in conjunction with FIG. 12 to FIG. 14.

Figure 17A:
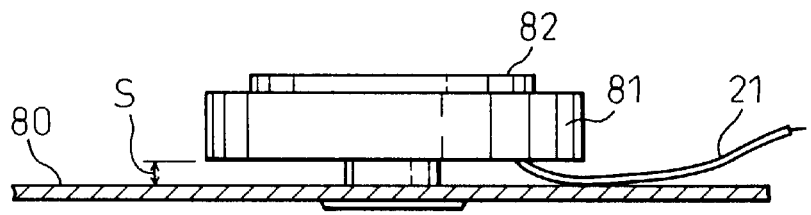
FIG. 17A is a side view for explaining a conventional way of routing a lead extended from a spindle motor included in a spindle motor assembly.

The reason why the two slits 88 are bored in the lift plate 80 in order to introduce the coil-coupled portion 21 of the flexible printed-circuit board to the back of the lift plate 80 will be described below. As shown in FIG. 17A, a conventional optical disk drive has a large enough height. There is a clearance S between the lift plate 80 and spindle motor 81. The coil-coupled portion 21 of the flexible printed-circuit board that is coupled to the winding of a coil included in the spindle motor 81 can be routed outside through the clearance S.

Figure 17B:
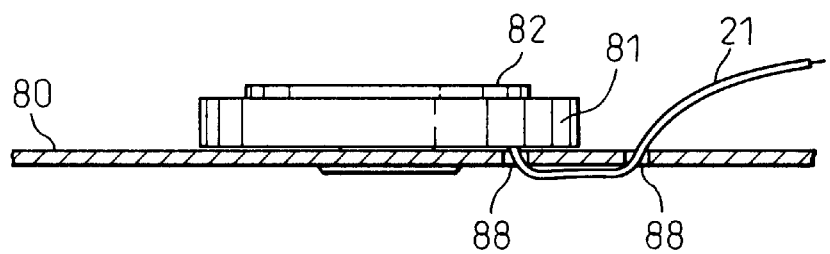
FIG. 17B is a side view for explaining an example of routing a lead extended from a spindle motor included in a spindle motor assembly according to the present invention.
Figure 17C:
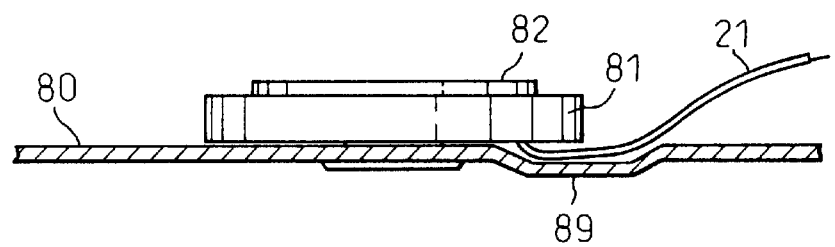
FIG. 17C is a side view for explaining another example of routing a lead extended from a spindle motor included in a spindle motor assembly according to the present invention.

However, the height of the optical disk drive in accordance with the present invention is so small that there is no clearance between the spindle motor 81 and lift plate 80 through which the coil-coupled portion 21 of the flexible printed-circuit board can be routed outside. In this embodiment, therefore, the slits 88 are, as shown in FIG. 17B, bored at positions located inside and outside an area on the lift plate 80 occupied by the spindle motor 81. The coil-coupled portion 21 of the flexible printed-circuit board is passed through the two slits 88 and coupled to the winding of the coil included in the spindle motor 81. FIG. 17C shows another example. A concave part 89 in which part of the coil-coupled portion 21 of the flexible printed-circuit board is stowed is formed to lie inside and outside the area on the lift plate 80 occupied by the spindle motor 81.

Figure 18A:
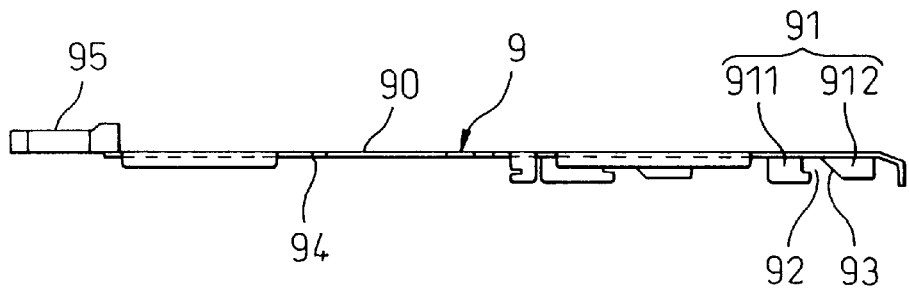
FIG. 18A is a side view showing an example of a sheet loader employed in an optical disk drive in accordance with the present invention.
Figure 18B:
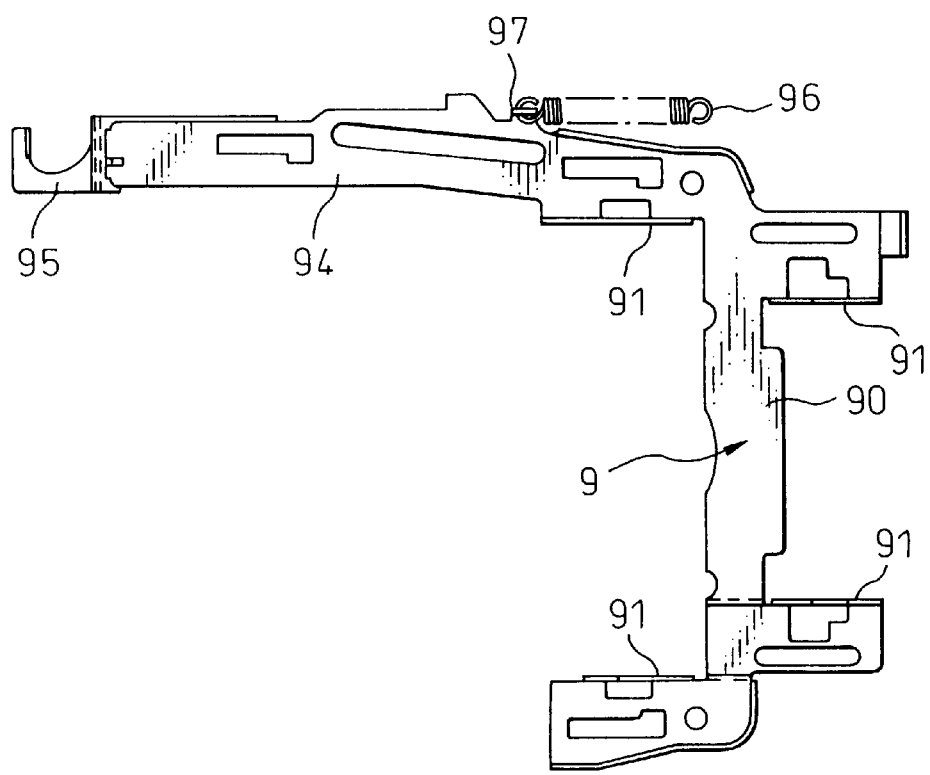
FIG. 18B is a plan view of the sheet loader shown in FIG. 18A.
Figure 19A:
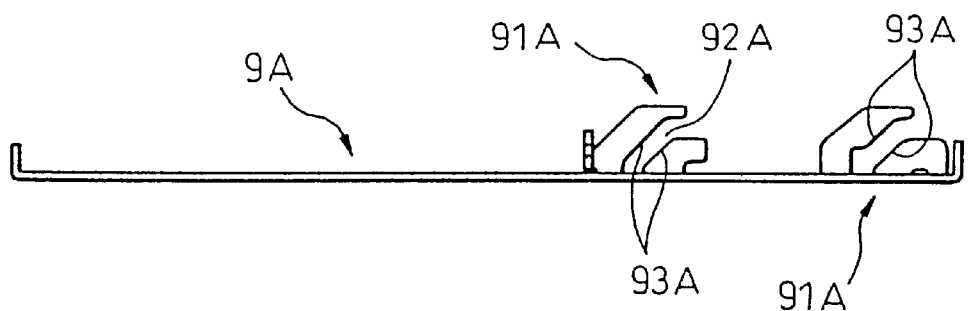
FIG. 19A is a side view of an example of a sheet loader employed in a conventional optical disk drive.
Figure 19B:
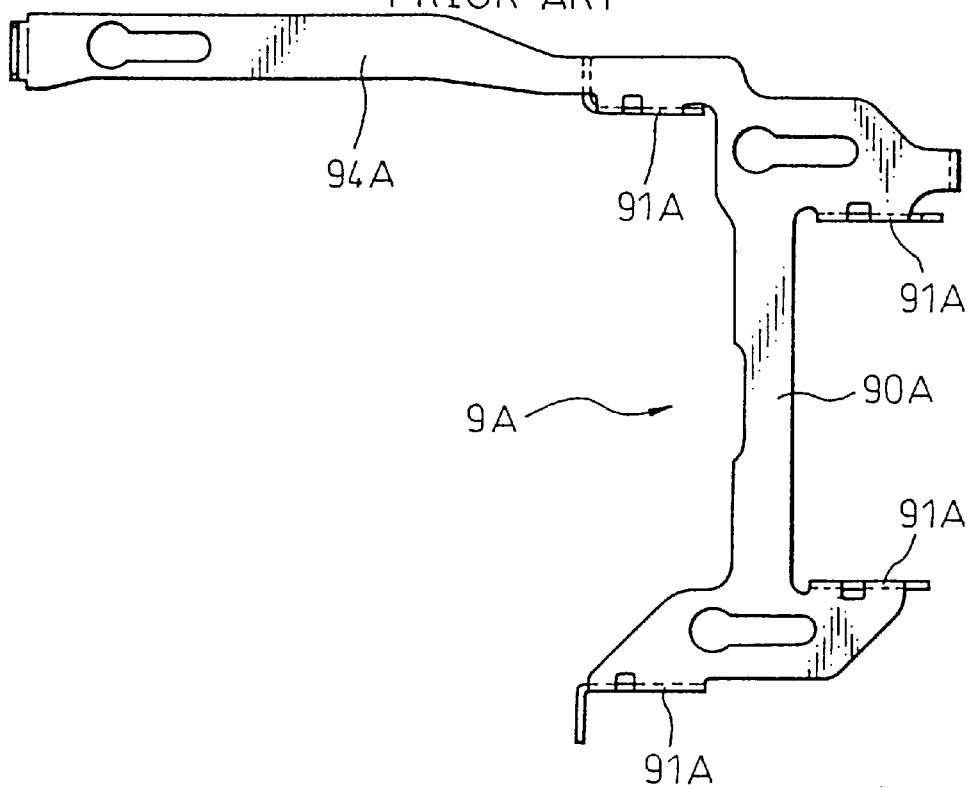
FIG. 19B is a plan view of the sheet loader shown in FIG. 19A.

Next, the sheet loader for lifting or lowering the lift plate 80 will be described below. FIG. 18A and FIG. 18B show an example of the sheet loader employed in an optical disk drive in accordance with the present invention. FIG. 19A and FIG. 19B show an example of a sheet loader employed in a conventional optical disk drive.

As shown in FIG. 19A and FIG. 19B, a conventional sheet loader 9A has an H-shaped body 90A that has an extension 94A. Four predetermined portions of the body 90A are bent to form lift guides 91A. Each lift guide 91A has a guide groove 92A that receives the side pin 83 described in conjunction with FIG. 16A and FIG. 16B. The guide groove 92A is defined with inclined planes 93A that are parallel to each other and meet the body 90A at an angle of 45°. The side pins attached to the lift plate 80 as described in conjunction with FIG. 16A and FIG. 16B are inserted into the guide grooves. When the sheet loader 9A moves back and forth, the side pins move within the guide grooves 92A along the inclined planes 93A of the lift guides 91A. Consequently, the spindle motor is lifted or lowered.

When the tilt of the spindle motor is adjusted to the greatest extent so that an optical disk will not interfere with the inner surface of a shell within the shell of an optical disk cartridge, the spindle motor can be deflected by approximately 30' at the maximum. According to the method of loading the spindle motor using the conventional sheet loader shown in FIG. 19A and FIG. 19B, the side pins are lifted along the 45°-inclined planes 93A formed on the lift guides 91A of the sheet loader 9A. The sheet loader 9A can be turned a little. However, if the tilt is large, a difference in the height between the left and right side pins cannot be absorbed to cause a biased contact phenomenon. Consequently, the sheet loader 9A fails to thrust the spindle motor assembly into the back of the base of the chassis.

In contrast, the sheet loader 9 in accordance with the present invention has, as shown in FIG. 18B, an H-shaped body 90 analogous to that of the conventional sheet loader 9A. The body 90 has an extension 94. Four predetermined portions of the body 90 are bent at right angles to form lift guides 91. Each lift guide 91 consists of a first guide 911 and a second guide 912. A guide groove 92 that receives the side pin 83 described in conjunction with FIG. 16A and FIG. 16B is formed between the first guide 911 and second guide 912. The side of the first guide 911 defining the guide groove 92 is perpendicular to the body 90. In this example, the distal end of the side of the first guide 911 defining the guide groove 92 is shaped like eaves. The side of the second guide 912 defining the guide groove 92 is an inclined plane 93 meeting the body 90 at 45°. The 45°-inclined plane 93 is formed on the side of the sheet loader comparable to the insertion port for an optical disk cartridge.

The body 90 of the sheet loader 9 has a bracket 98 formed near the border between the body 90 and extension 94. A tension spring 96 is attached to the bracket 97. The tension spring 96 is laid between the sheet loader 9 and the chassis 50. Furthermore, the distal portion of the extension 94 is formed as an engagement portion that is engaged with the timing arm as described later. The engagement portion 95 to be engaged with the timing arm is coupled to the ejection motor 68 shown in FIG. 15.

The side pins 83 formed on the lift plate 80 as described in conjunction with FIG. 16A and FIG. 16B are, as detailed later, located on the sides of the second guides 912 parallel to the body 90 with no optical disk cartridge inserted. While an optical disk cartridge is being inserted into the optical disk drive, the sheet loader 9 is immovable. The side pins 83 stay on the second guides 912. Once the optical disk cartridge is fully inserted in the optical disk cartridge, the sheet loader 9 is moved quickly and the side pins 83 are put in the guide grooves 92. When the optical disk cartridge is ejected, the sheet loader 9 is moved back to its original position and the side pins 83 are slid on the inclined planes 93.

Figure 20A:
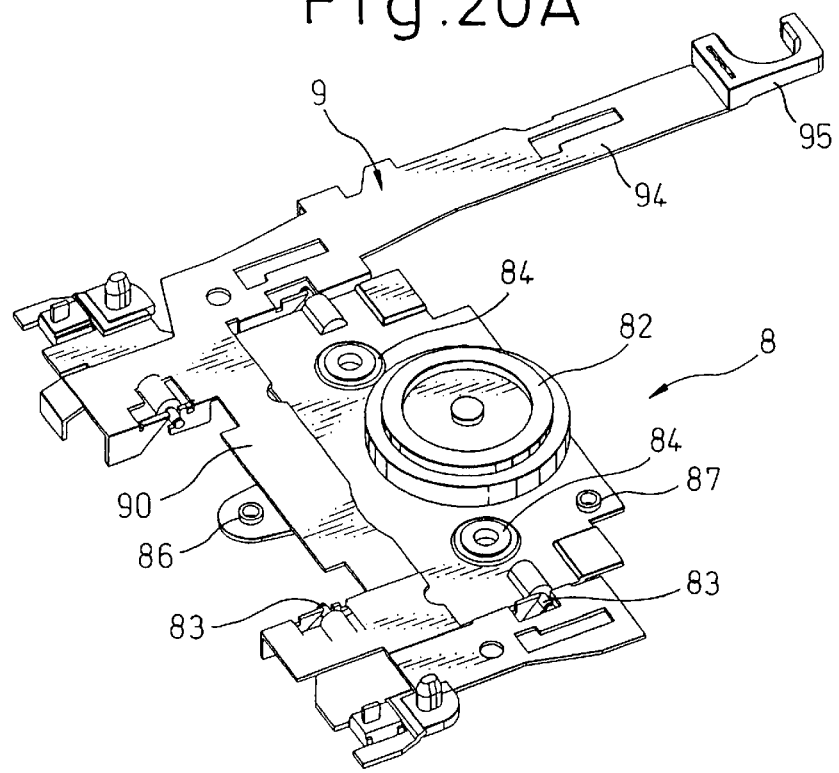
FIG. 20A is a perspective drawing showing the spindle motor assembly in accordance with the present invention, which is shown in FIG. 16A and FIG. 16B, joined with the sheet loader in accordance with the present invention shown in FIG. 18A and FIG. 18B.
Figure 20B:
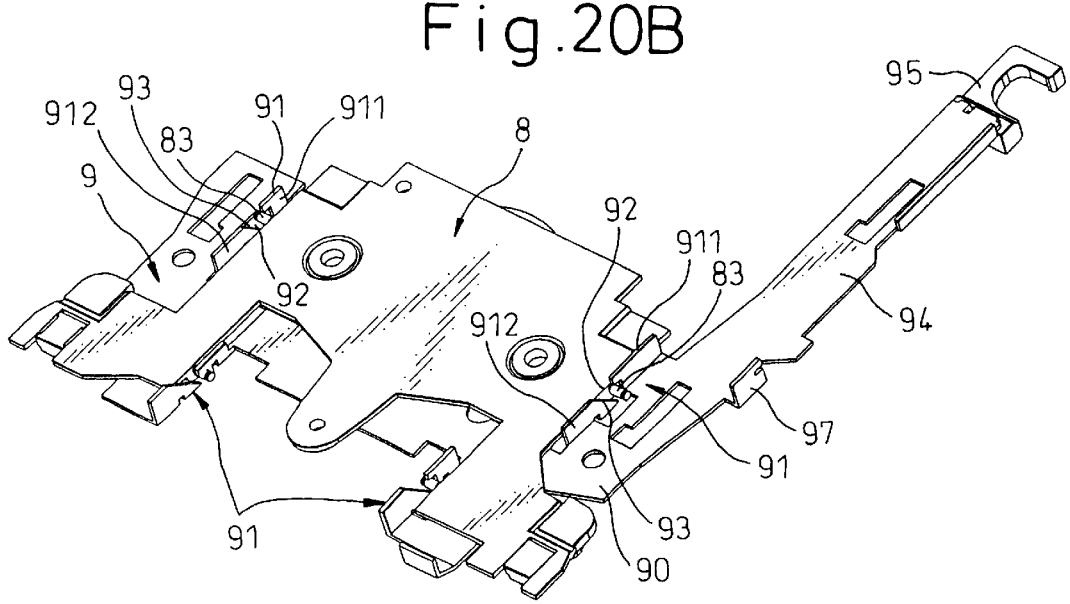
FIG. 20B is a perspective drawing showing the spindle motor assembly and sheet loader, which are joined as shown in FIG. 20A, seen from the bottom of the sheet loader.

FIG. 20A and FIG. 20B show the spindle motor assembly 8 shown in FIG. 16A and FIG. 16B and the sheet loader 9 shown in FIG. 18A and FIG. 18B which are joined. FIG. 20A is a top view, while FIG. 20B is a bottom view. The spindle motor assembly 8 and sheet loader 9 have already been described and an iteration will be avoided. FIG. 20A and FIG. 20B show a state in which the side pins 83 are put in the guide groove 92 of the lift guides 91.

Figure 21:
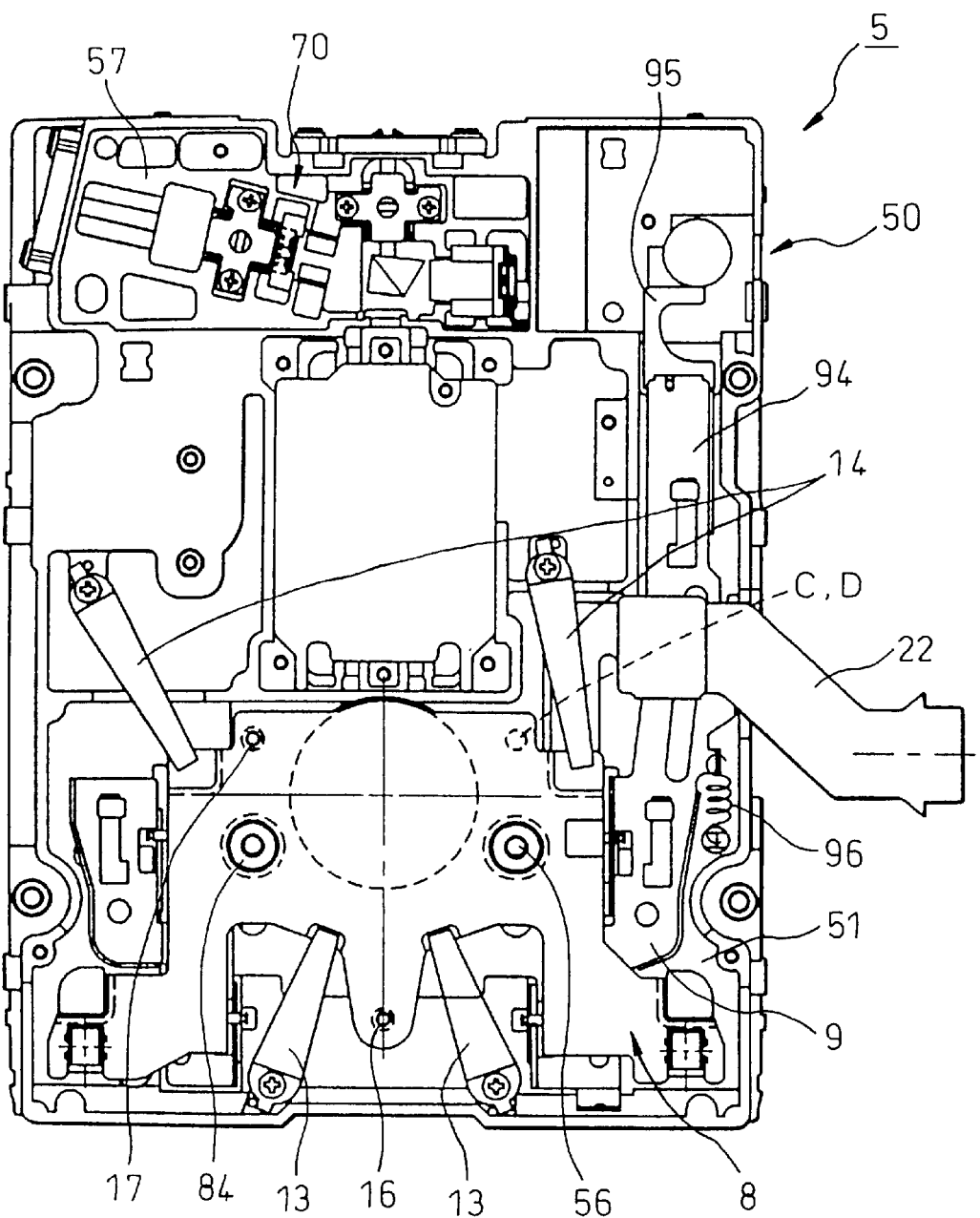
FIG. 21 is a bottom view of the stationary optical unit and the spindle motor assembly and sheet loader shown in FIG. 20A and FIG. 20B mounted on the chassis.

FIG. 21 is a bottom view of the main body 5 in which the stationary optical assembly 70 is incorporated in the stationary optical unit 57 of the chassis 50, and the spindle motor assembly 8 and sheet loader 9 are joined as shown in FIG. 20A and FIG. 20B. Reference numeral 22 denotes a flexible printed-circuit board. As described previously, the side pins 83 are put in the guide grooves 92 with an optical disk cartridge fully inserted, because the lift plate is constrained to move towards the chassis by the blade springs 13 and 14. Moreover, the sheet loader 9 is constrained to move downwards in the drawing, or in other words, towards the insertion port for an optical disk cartridge by means of the tension spring 96 laid between the sheet loader 9 and chassis 50.

In the present embodiment, tapping screws may be used as the screws 15. Moreover, the first and second adjustment screw holes 86 and 87 bored in the lift plate 80 and the height level D should preferably be arranged at intervals of substantially 120° with the rotation shaft of the spindle motor 81 as a center. In this case, the distances of the first and second adjustment screw holes 86 and 87 bored in the lift plate 80 and the height level D from the rotation shaft of the spindle motor 81 are substantially the same as one another.

Figure 22:
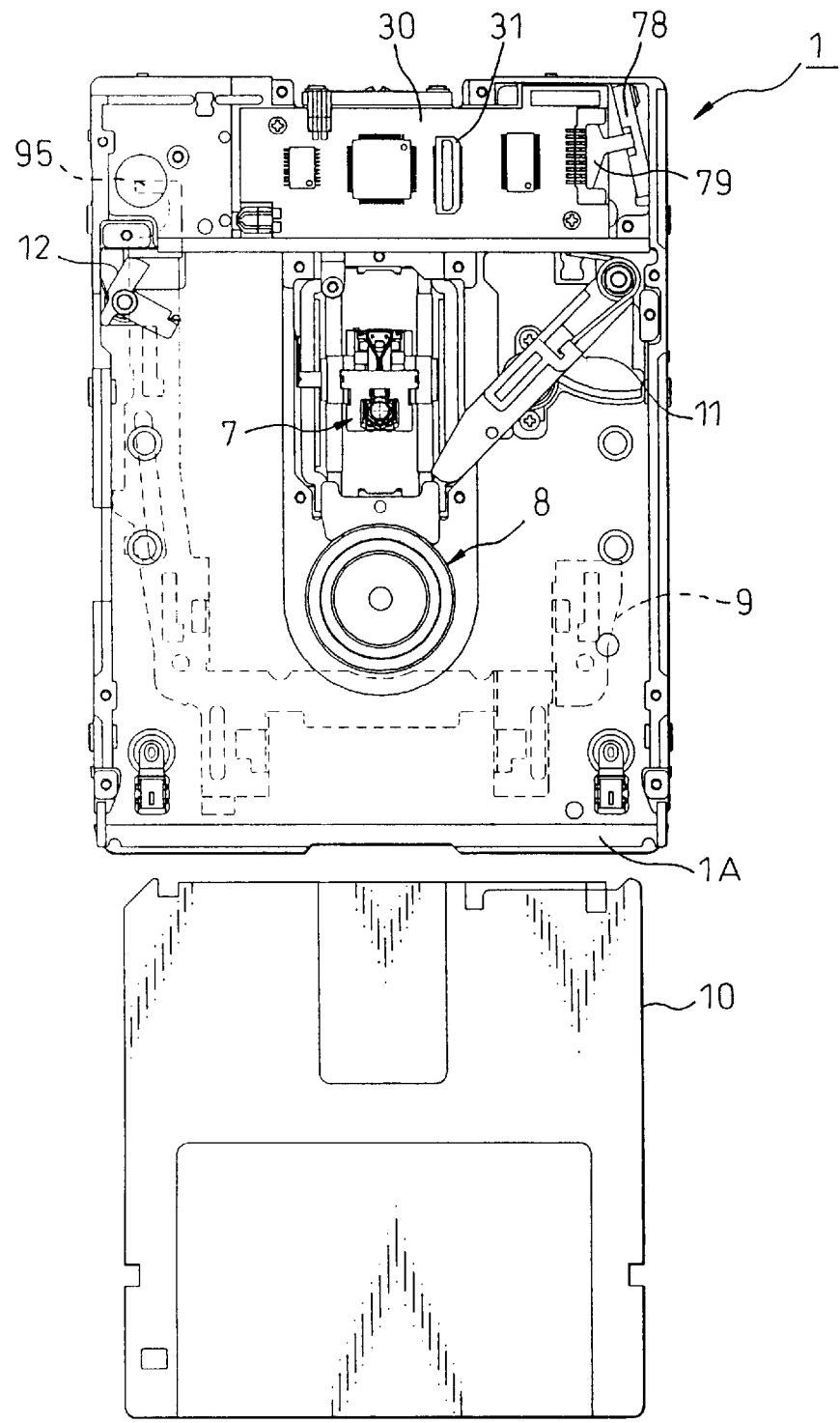
FIG. 22 is a plan view of the optical disk drive shown in FIG. 9 with an optical disk cartridge about to be inserted into the optical disk drive, showing the states of an ejection arm and a timing arm and the position of the sheet loader.
Figure 23:
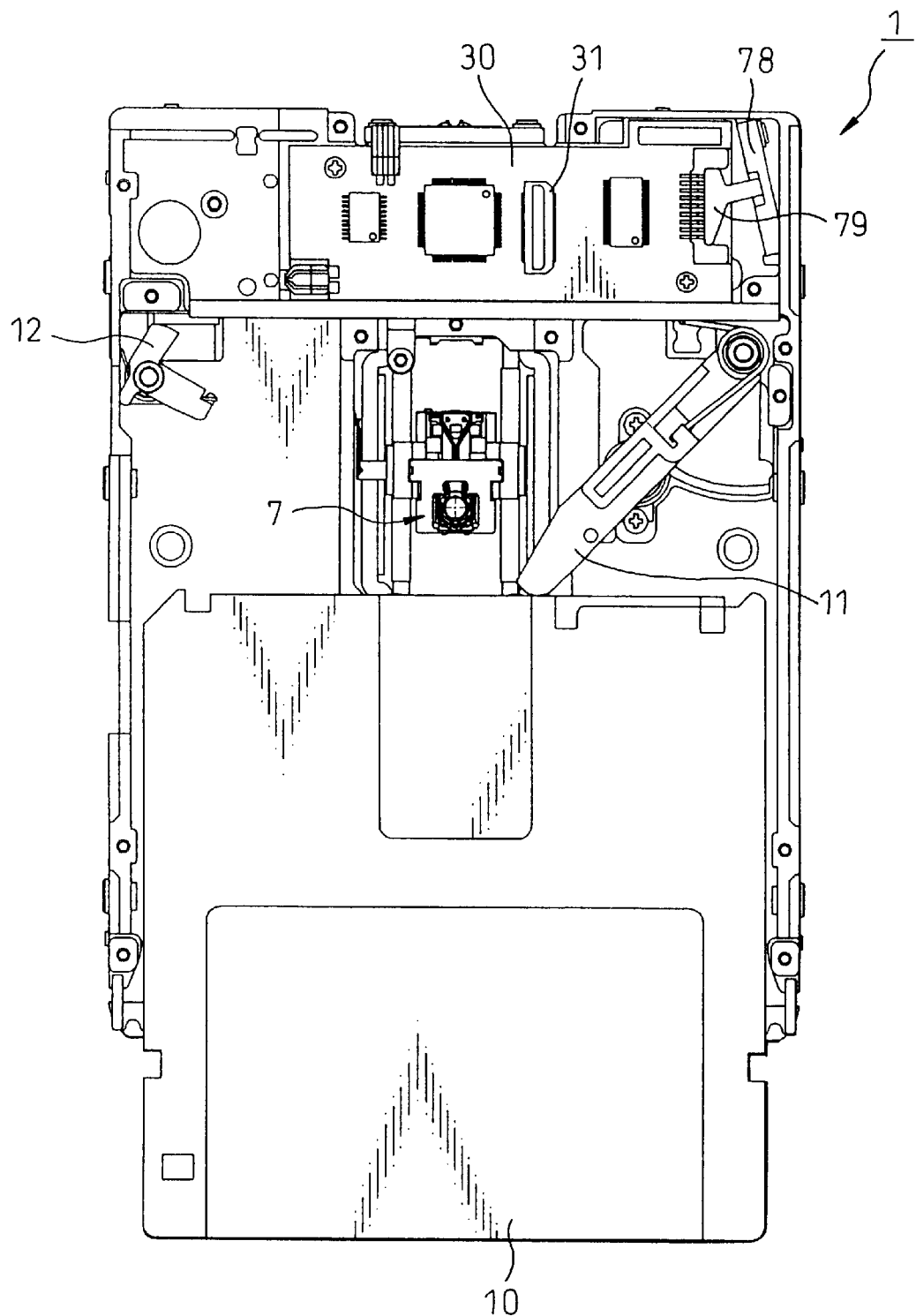
FIG. 23 is a plan view of the optical disk drive shown in FIG. 22 with the optical disk cartridge inserted halfway.
Figure 24:
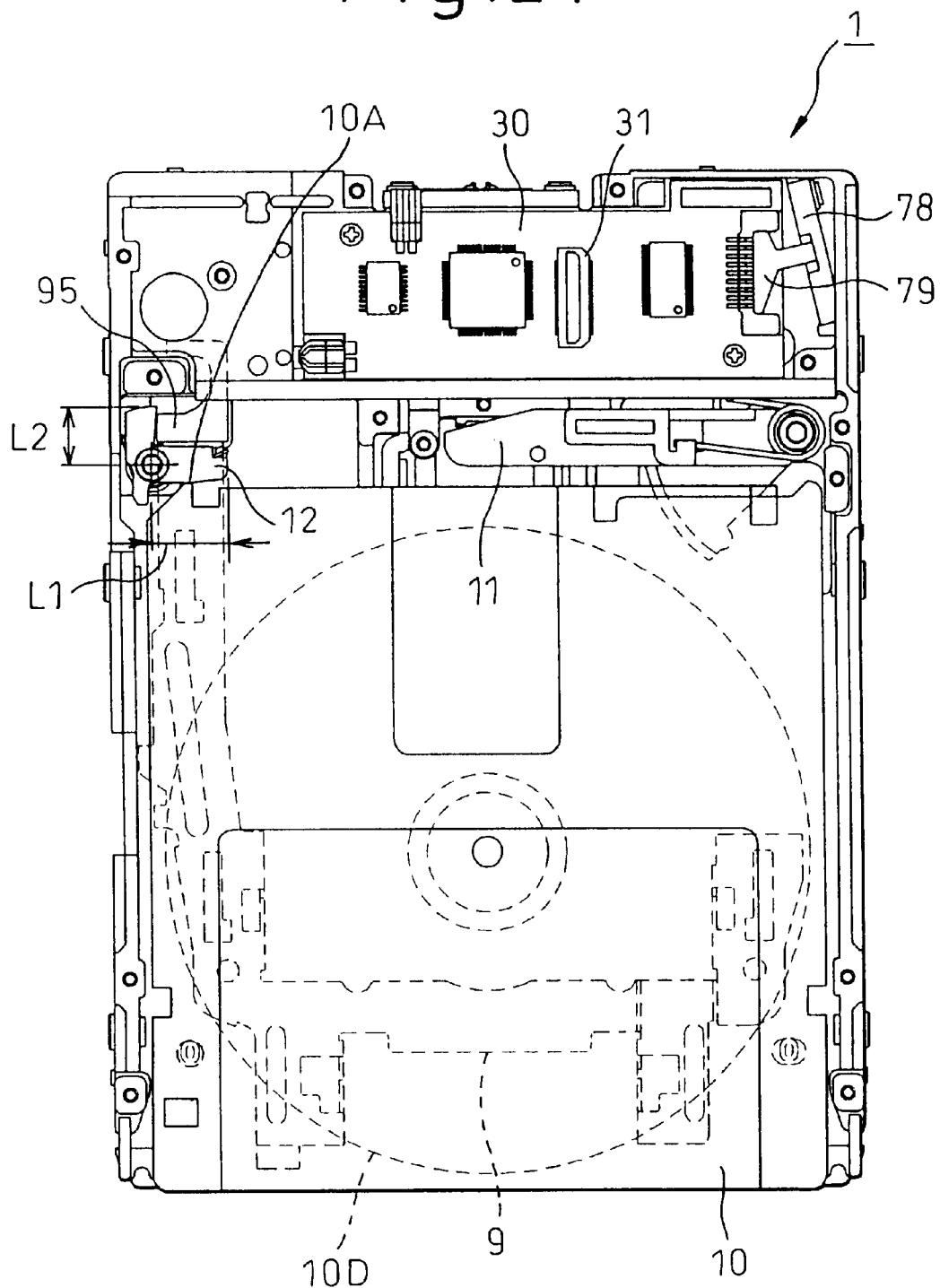
FIG. 24 is a plan view of the optical disk drive shown in FIG. 22 with the optical disk cartridge fully inserted thereinto, showing the states of the ejection arm and timing arm and the position of the sheet loader.
Figure 25A:
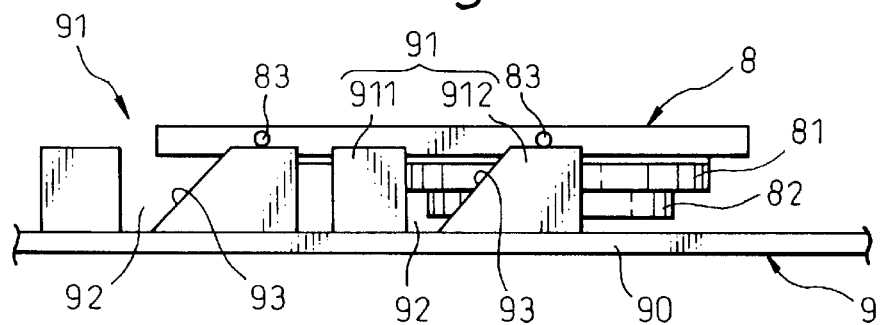
FIG. 25A to FIG. 25C are explanatory diagrams showing the states of the sheet loader and spindle motor assembly which are engaged with each other when the optical disk cartridge is inserted into the optical disk drive as shown in FIG. 22 to FIG. 24.
Figure 25B:
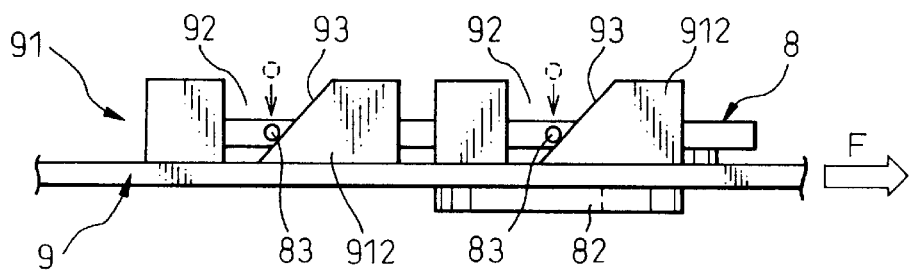
Figure 25C:
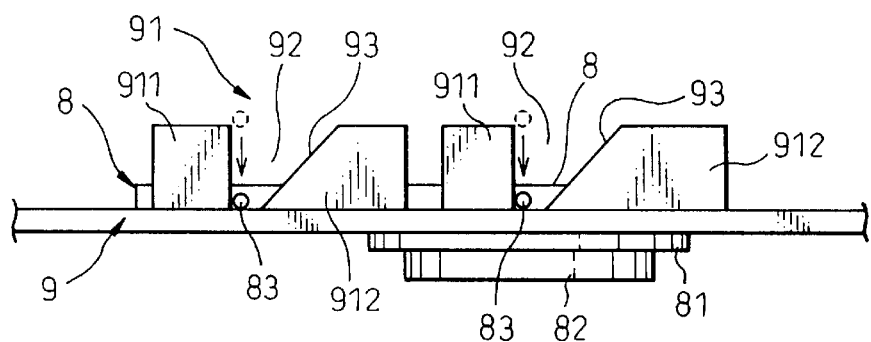
Figure 25D:
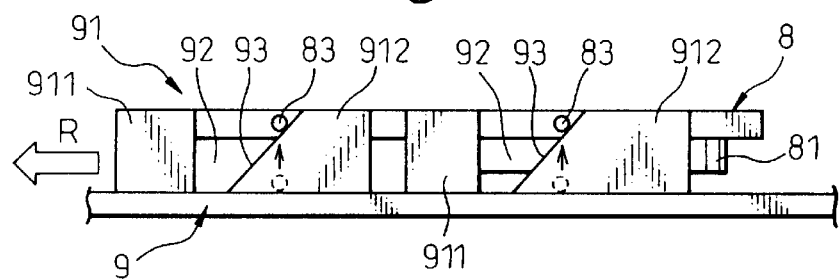
FIG. 25D is an explanatory diagram showing the states of the sheet loader and spindle motor assembly which are engaged with each other when the optical disk cartridge is ejected from the optical disk drive.

Next, movements made by the spindle motor assembly 8 and sheet loader 9 when an optical disk cartridge is inserted into the optical disk drive 1 will be described together with movements made by the ejection arm 11 and timing arm 12 in conjunction with FIG. 22 to FIG. 25. FIG. 22 shows a state of the optical disk drive 1, which is shown in FIG. 9, into which the optical disk cartridge 10 is about to be inserted. FIG. 23 shows a state of the optical disk drive 1 into which the optical disk cartridge 10 is inserted halfway. FIG. 24 shows a state of the optical disk drive 1 in which the optical disk cartridge 10 is fully inserted. FIG. 25A to FIG. 25C show joined states of the spindle motor assembly 8 and sheet loader 9 that are attained time-sequentially with the progress of insertion of the optical disk cartridge 10 as shown in FIG. 22 to FIG. 24. FIG. 25D shows a joined state of the spindle motor assembly 8 and sheet loader 9 attained when the optical disk cartridge 10 is ejected.

Before the optical disk cartridge 10 is inserted into the optical disk drive 1, the ejection arm 11 and the L-shaped timing arm 12 composed of two arms stand still after pivoting by predetermined angles towards the insertion port 1A for the optical disk cartridge 10. At this time, one arm of the timing arm 12 is engaged with the engagement portion 95 of the sheet loader 9 that engages with the timing arm. This prevents the sheet loader 9 from moving towards the insertion port 1A for the optical disk cartridge 10. The timing arm 12 responds to the movement of the optical disk cartridge 10 so as to indicate the timing of chucking the turntable 82 of the spindle motor assembly 8 to the hub of an optical disk.

FIG. 25A shows the joined state of the spindle motor assembly 8 and sheet loader 9 attained at this time. When the optical disk cartridge 10 is not inserted, the side pins 83 fixed to the lift plate 80 of the spindle motor assembly 8 are all located on the sides of the second guides 912 parallel to the body 90.

As the optical disk cartridge 10 is inserted into the optical disk drive 1, the distal end of the optical disk cartridge 10 is, as shown in FIG. 23, abutted on the ejection arm 11. When the optical disk cartridge 10 is further inserted into the optical disk drive 1, the ejection arm 11 pivots. With the insertion of the optical disk cartridge 10 into the optical disk drive 1, the shutter of the optical disk cartridge 10 is opened by the first shutter opening/closing piece 43 described in conjunction with FIG. 7 and FIG. 8. This mechanism does not fall within the scope of the present invention, and a description of the mechanism will be omitted. The joined state of the spindle motor assembly and sheet loader 9 attained at this time is identical to the state shown in FIG. 25A because the sheet loader 9 does not move.

When the optical disk cartridge 10 is further inserted into the optical disk drive 1, the distal end of the optical disk cartridge 10 is abutted on the timing arm 12. This causes the timing arm 12 to pivot. When the optical disk cartridge 10 is fully inserted in the optical disk drive 1, the timing arm 12 fully pivots. This causes one of the arms of the timing arm 12 to disengage from the engagement portion 95 of the sheet loader 9 that engages with the timing arm. Consequently, the sheet loader 9 is moved towards the insertion port 1A for the optical disk cartridge 10 due to tensile force exerted by the tension spring 96 described in conjunction with FIG. 21.

FIG. 25B and FIG. 25C show movements made by the spindle motor assembly 8 and sheet loader 9 at this time. When the optical disk cartridge 10 is fully inserted in the optical disk drive 1, the sheet loader 9 is moved quickly towards the insertion port 1A for the optical disk cartridge 10 as indicated with an arrow F in FIG. 25B. Consequently, the side pins 83 located on the sides of the second guides 912 parallel to the body 90 are all put in the guide grooves 92. When the movement of the sheet loader 9 towards the insertion port 1A for the optical disk cartridge 10 is completed, the side pins 82, as shown in FIG. 25C, all land on the bottoms of the guide grooves 92, or in other words, on the sheet loader 9. According to the present invention, each lift guide 91 has only one inclined plane 93. When the sheet loader 9 is used to load the spindle motor assembly, the inclined planes 93 of the lift guides 91 are unused. No pressing force operates in the radial direction of the spindle motor assembly 8. In the present embodiment, the sides of the first guides 911 of the lift guides 91 defining the guide grooves 92 are formed as vertical contact portions that are perpendicular to the body 90 of the sheet loader 9. When the putting of the side pins 83 in the guide grooves 92 is completed, the side pins 83 are pressed in the radial direction due to the vertical contact portions. Consequently, pressing force operates on the spindle motor 81 in the radial direction of the spindle motor. The pressing force is exerted by the tension spring 96.

In this state, the turntable 82 of the spindle motor 81 juts out from the base 51 into the optical disk cartridge stowage 60 described in conjunction with FIG. 9. The turntable 82 is chucked to the hub of an optical disk in the optical disk cartridge whose shutter is opened. With the turntable chucked to the hub of the optical disk in the optical disk cartridge 10, the tilt of the lift plate 80 relative to the base 51 is held adjusted owing the first and second tilt adjustment screws 16 and 17 and the height level D which are described previously.

The timing arm 12 responds to the movement of the optical disk cartridge 10 so as to determine the timing of moving the sheet loader 9. Assuming that the length of one of the two arms of the timing 12 from the rotation shaft thereof to an end thereof that comes into contact with the optical disk cartridge 10 is L1 and that the length of the other arm thereof from the rotation shaft thereof to an end thereof that triggers movement of the sheet loader 9 is L2, the relationship between L1 and L2 is L1=L2 or L1>L2.

When the optical disk cartridge 10 is stowed in the optical disk drive 1, if the eject button 1E shown in FIG. 15 or the like is pressed, the optical disk cartridge 10 is ejected. At this time, the ejection motor 68 is actuated. The ejection motor 68 causes the sheet loader 9 to move in a direction opposite to the insertion port 1A for an optical disk cartridge, or in other words, in a direction of an arrow R in FIG. 25D via the engagement portion 95 of the sheet loader that engages with the timing arm. Consequently, the side pins 83 fixed to the lift plate 80 of the spindle motor assembly 8 are moved along the inclined planes 93 of the second guides 912. Eventually, the turntable 82 of the spindle motor 81 chucked to the hub of the optical disk is freed.

With the movement of the sheet loader 9, the side pins 83 are all disposed on the sides of the lift guides parallel to the body 90. The state shown in FIG. 25A is then restored. When the movement of the sheet loader 9 is completed, the timing arm 12 pivots due to a force exerted by the spring. The arm of the timing arm locks the engagement portion 95 of the sheet loader 9 that engages with the timing arm. Consequently, the sheet loader 9 is locked by the timing arm 12. The ejection arm 11 starts pivoting when the turntable 82 of the spindle motor 81 chucked to the hub of the optical disk is freed completely and no longer juts out into the optical disk cartridge stowage 60. Eventually, the optical disk cartridge is ejected outside the optical disk drive 1.

As mentioned above, according to the present embodiment, the spindle motor assembly 8 has a tilt adjusting mechanism. This results in a low-cost and compact optical disk drive employing a replaceable optical disk cartridge.

Next, the structure of the stationary optical unit included in the optical disk drive 1 will be described below. Prior to a description of an example of the structure of the stationary optical unit included in the optical disk drive in accordance with the present invention, the disadvantages of a conventional optical unit will be described in conjunction with FIG. 26 and FIG. 27.

Figure 26:
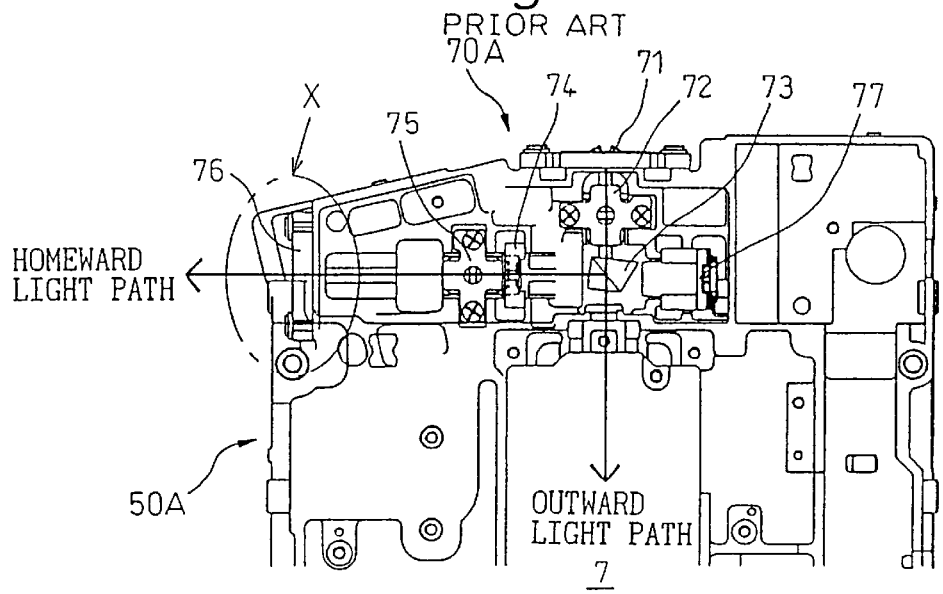
FIG. 26 is a plan view of part of a chassis of a conventional optical disk drive showing disposition of a stationary optical unit.

FIG. 26 shows the layout of optical elements constituting a stationary optical assembly 70A included in a conventional optical disk drive. In the conventional optical disk drive, a homeward light path along which light reflected from an optical disk is routed to a sensor meets an outward light path from a laser light source to the optical disk at right angles. A description will be made based on the conventional stationary optical assembly 70A shown in FIG. 26. Laser light emanating from a laser diode 71 is passed through a collimator lens 72 and a beam splitter 73 and routed to the movable optical unit 7. The light is then irradiated to an optical disk. This laser light path from the laser diode 71 to the movable optical unit 7 shall be referred to as an outward light path. In contrast, there is a path of light reflected from the optical disk, passed through the beam splitter 73, a servo unit (wave front dividing element) 74, and a condenser 75, and routed to a sensor 76. This light path along which light split by the beam splitter 73 is propagated to the sensor 76 shall be referred to as a homeward light path. Reference numeral 77 denotes a light level monitor unit. In the conventional optical disk drive, the homeward light path is orthogonal to the outward light path.

In the conventional optical disk drive, another component is located in an area X in which the sensor 76 is disposed. Interference with light by the component occurs in the area X. In the conventional optical disk drive, the stationary optical assembly 70A is therefore separated from a chassis 50A by a distance Y in order to avoid the interference by the component occurring in the area X. This poses a problem in that the overall length (depth) of the optical disk drive increases.

Figure 28A:
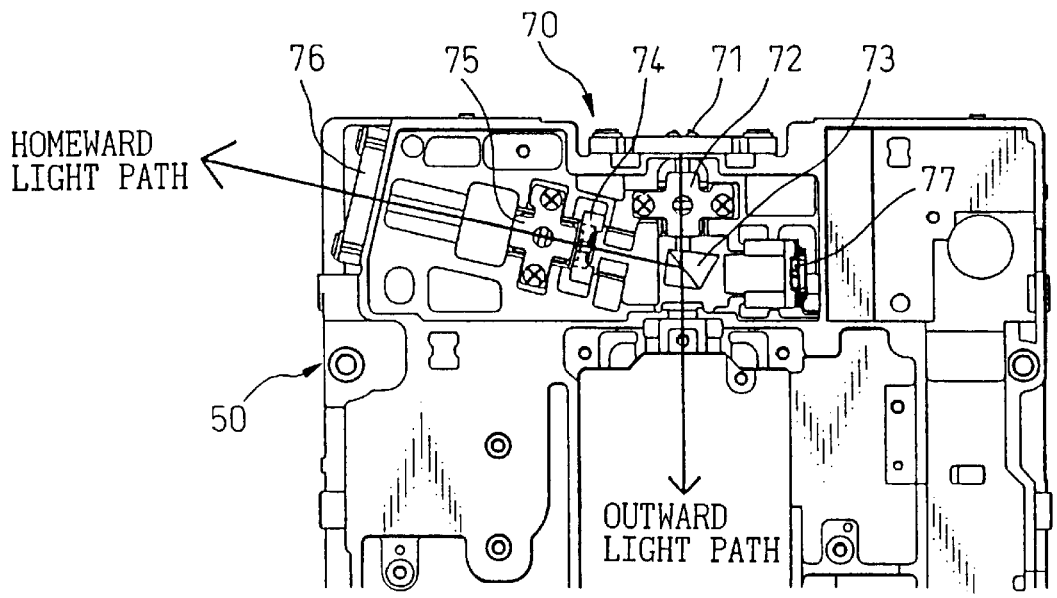
FIG. 28A is a plan view of part of the chassis showing disposition of the stationary optical unit in the optical disk drive in accordance with the present invention.

In the optical disk drive in accordance with the present invention, a homeward light path along which light reflected from an optical disk is passed through the beam splitter 73 and routed to a sensor meets an outward light path, which extends from a laser light source to the optical disk, at $90°+\alpha°$. A description will be made based on the stationary optical assembly 70, which is shown in FIG. 28A, employed in the embodiment of the present invention. Laser light emanating from a laser diode 71 is passed through a collimator lens 72 and a beam splitter 73, routed to the movable optical unit 7, and irradiated to an optical disk. This light path is an outward light path. A homeward light path is a path along which light reflected from the optical disk is separated by the beam splitter 73, passed through a servo unit (wave front dividing element) 74 and a condenser 75, and routed to the sensor 76. An angle at which the homeward light path meets the outward light path is larger than 90°. Reference numeral 77 denotes a light level monitor unit for monitoring the amount of light emanating from the laser diode 71.

Figure 27:
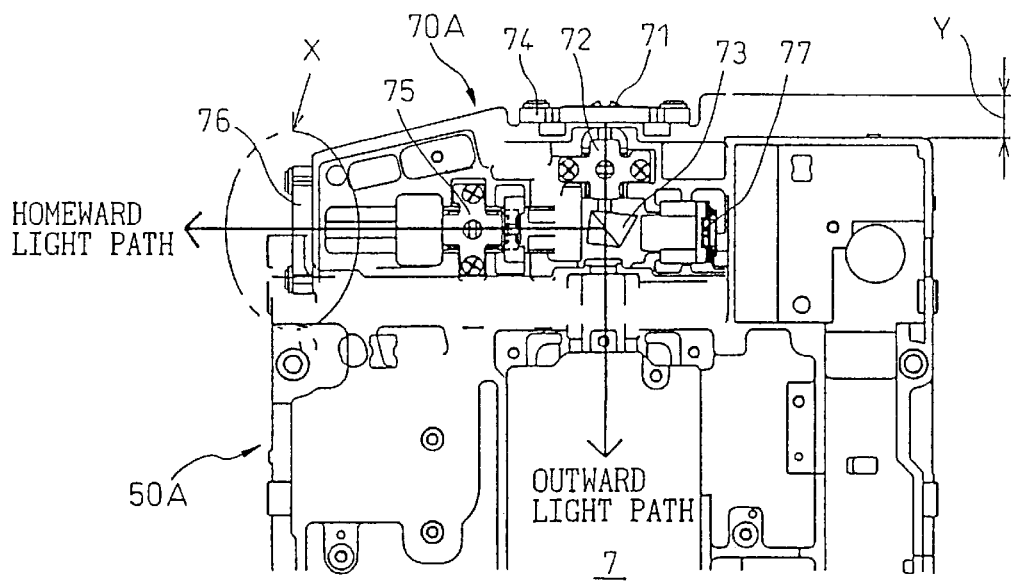
FIG. 27 is a plan view of part of the chassis of the optical disk drive for explaining the disadvantage of the disposition of the stationary optical unit in the conventional optical disk drive.
Figure 28B:
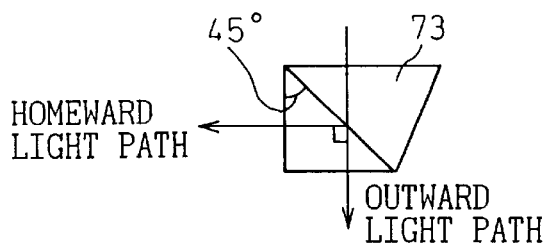
FIG. 28B shows a disposition of the same beam splitter as that shown in FIG. 28A in the stationary optical unit included in the conventional optical disk drive.
Figure 28D:
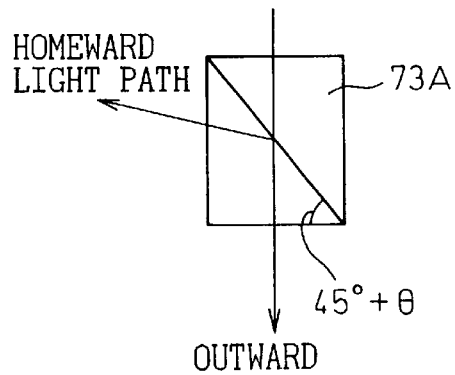
FIG. 28D shows another example of the beam splitter included in the stationary optical unit in the optical disk drive in accordance with the present invention.
Figure 28C:
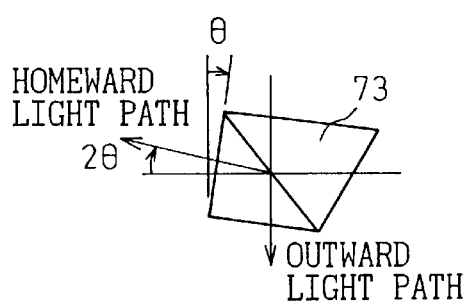
FIG. 28C shows a disposition of the beam splitter included in the stationary optical unit in the optical disk drive in accordance with the present invention.

In the conventional optical disk drive shown in FIG. 26 and FIG. 27, an interface created in the beam splitter 73 meets, as shown in FIG. 28B, the outward light path at 45°. In the optical disk drive in accordance with the present embodiment shown in FIG. 28A, the beam splitter 73 is, as shown in FIG. 28C, tilted by $\theta°$. This is intended to make an angle, at which the homeward path of light branched by the beam splitter 73 meets the outward light path, larger than 90°. Consequently, according to the present embodiment, the homeward light path meets the outward light path at $90°+2\theta°$. In this case, the rectilinearity of laser light propagated along the homeward path remains substantially unvaried. However, light emitted from the beam splitter 73 is deflected by several tens of micrometers from light incident thereon because of refraction. In the present embodiment, as shown in FIG. 28A, the beam splitter 73 is tilted by 6.5° so that the homeward light path will meet the outward light path at $90°+13°$.

Since the homeward light path meets the outward light path at $90°+2\theta°$, the position of the sensor 76 is separated from the center of the chassis 50. Light will therefore not be interfered with by any other component located near the position of the sensor 76. In the present embodiment, it is unnecessary to change the position of the sensor 76 for the purpose of avoiding interference by any other component. Consequently, the overall length (depth) of the optical disk drive can be minimized.

In the present embodiment shown in FIG. 28A, the conventional beam splitter 73 is used as it is, and is mounted on the chassis 50 while being tilted by a predetermined angle. Alternatively, as shown in FIG. 28D, the beam splitter 73 may not be tilted but a novel beam splitter 73A having a reflecting surface tilted by $45°+\theta°$ may be employed. Use of the beam splitter 73A has the same results as those of the beam splitter 73.

Figure 29:
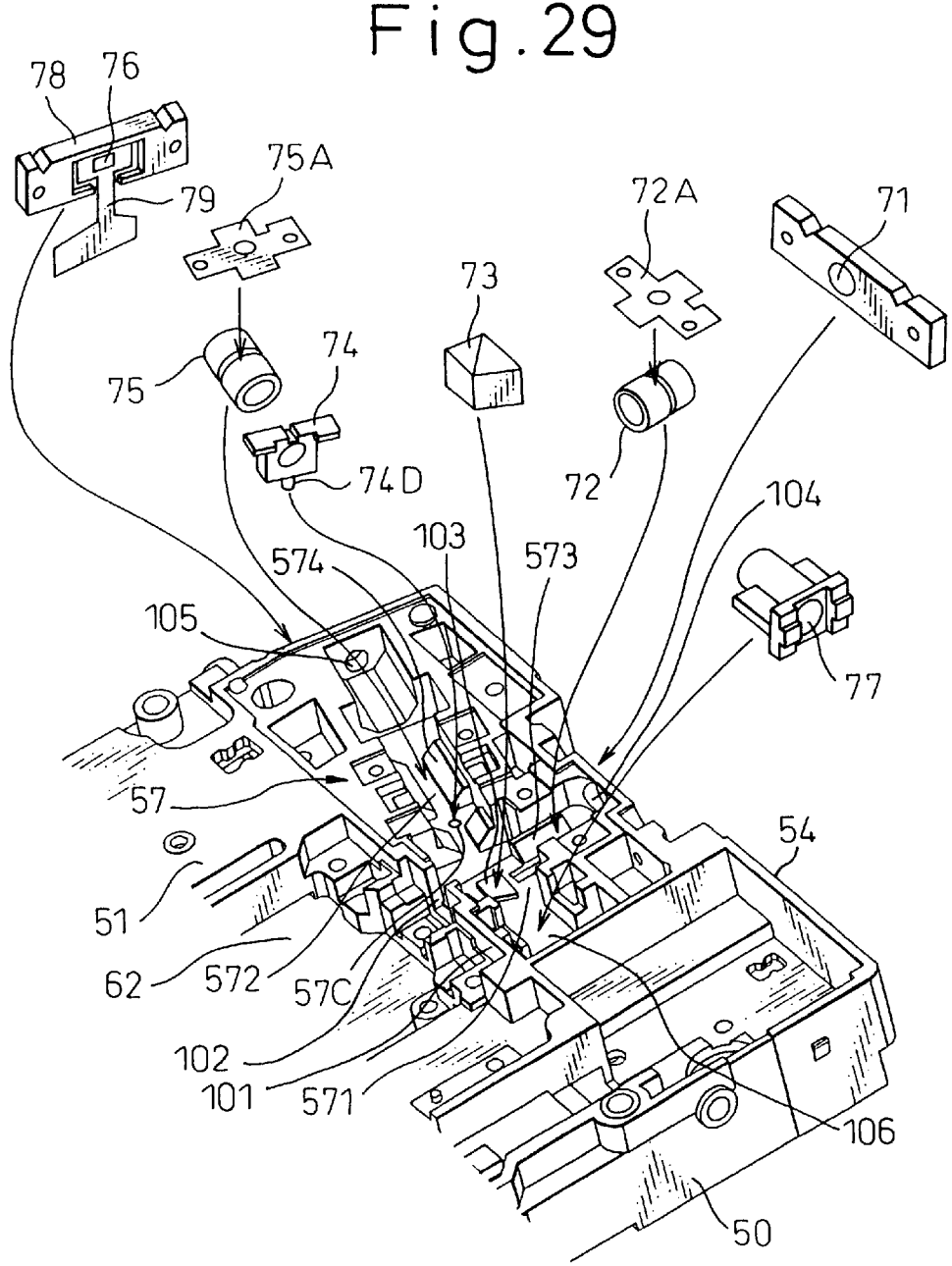
FIG. 29 is an exploded perspective drawing for explaining incorporation of optical elements into the stationary optical unit mounted on the chassis of the optical disk drive in accordance with the present invention.

FIG. 29 is an explanatory diagram concerning integration of optical elements into the stationary optical unit 57 of the chassis 50 included in the optical disk drive 1 in accordance with the present invention. The stationary optical unit 57 of the chassis 50 is constructed so that a homeward path of light reflected from the beam splitter 73 will meet an outward light path at $90°+2\theta°$. Specifically, the stationary optical unit 57 of the chassis 50 has a first groove 571 and a second groove 572 formed therein. A window 102 is provided on a partition wall 101 which partitions the movable optical unit stowage 62 and the stationary optical unit 57. The window 102 passes a laser light. The first groove 571 is extended along an extension of a direction of movement of a carriage included in the adjoining movable optical unit 7. The second groove 572 is extended in a direction that meets the direction of the first groove 571 at 90°+2θ°. The beam splitter 73 is located on the pedestal 103 at an intersection between the first groove 571 and second groove 572. Moreover, the laser diode 71 and collimator lens 7 are locked in the first groove 571. The servo unit 74, the condenser 75, and the sensor 76 mounted in a sensor mount 78 are locked in the second groove 572. A window 104 provided on the side wall 54 passed the laser light emitted from the laser diode 71 and a window 105 provided on the side wall 54 passes the laser light to the sensor 76.

An alignment projection 74D projects from the servo unit 74. The alignment projection 74D is fitted into an alignment hole 57C bored in the second groove 572. Alignment of the servo unit 74 will be described later. Moreover, the sensor 76 is mounted on a flexible printed-circuit board 79. The other end of the flexible printed-circuit board 79 is coupled to a printed-circuit board to be described later. The light level monitor unit 77 is located at a stowage 106 opposite to the second groove 572 with the beam splitter 73 between them.

Incidentally, the chassis 50 is generally die-cast. As long as no extra measures are taken, the precision in the dimensions of the stationary optical unit 57 of the die-cast chassis 50 is low. At least a collimator lens-mounted portion 573 of the first groove 571 and a condenser-mounted portion 574 of the second groove 572 are machined afterwards to have highly precise dimensions. The collimator lens-mounted portion 573 and condenser-mounted portion 574 each have two inclined planes that are inclined in mutually opposite directions. The collimator lens 72 and condenser 75 are placed on the inclined planes. In the present embodiment, the collimator lens 72 is pressed using a sheet presser 72A after placed on the collimator lens-mounted portion 573. The collimator lens 72 is thus precisely aligned and locked in the first groove 75. Likewise, the condenser 75 is pressed using a sheet presser 75A after placed on the condenser-mounted portion 574. The condenser 75 is thus precisely aligned and locked in the second groove 572.

Now, alignment of the servo unit 74 will be described below. Beforehand, a conventional method of aligning the servo unit 74 will be described below.

Figure 30A:
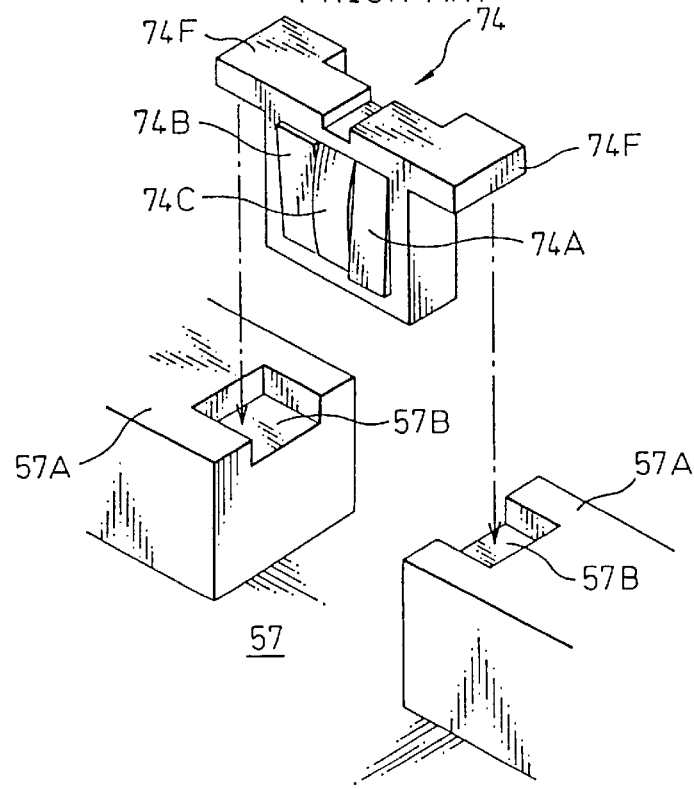
FIG. 30A and FIG. 30B are perspective drawings showing part of the stationary optical unit in the conventional optical disk drive, thus explaining how to align a servo unit.
Figure 30B:
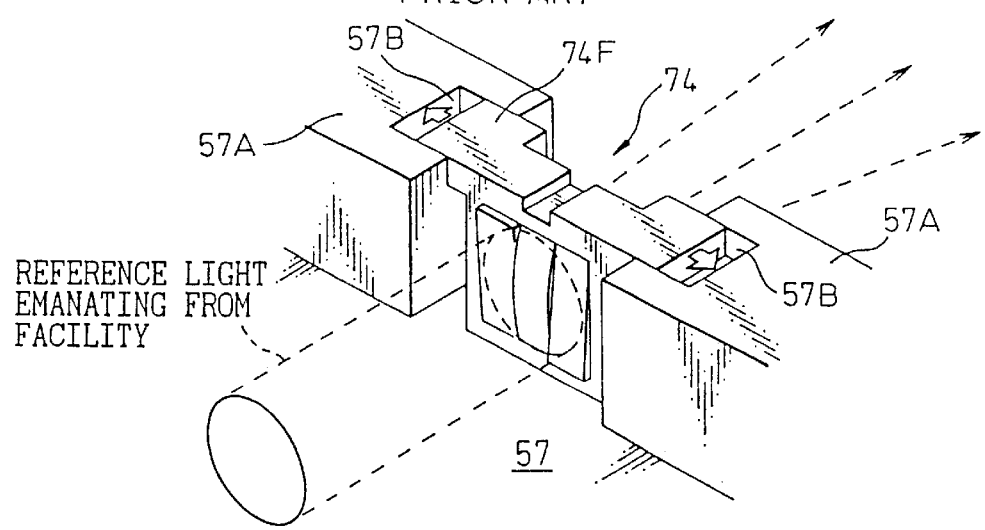

FIG. 30A and FIG. 30B are explanatory diagrams concerning the conventional method of aligning the servo unit 74 in an optical disk drive. The stationary optical unit 57 has attachment blocks 57A opposed to each other. Each attachment block 57A has, as shown in FIG. 30A, an attachment notch 57B formed in the top thereof. The servo unit 74 serving as a wave front dividing element for dividing incident light into three light rays is interposed between the opposed surfaces of the attachment blocks 57A. The servo unit 74 has two wedged parts 74A and 74B whose longitudinal sections are tapered. A curved plane 74C is sandwiched between the wedged parts 74A and 74B. The surfaces of the wedged parts 74A and 74B are inclined in mutually opposite directions. A flange 74F is formed on both sides of the top of the servo unit 74.

For placing the servo unit 74 in a space between the attachment blocks 57A, the flanges 74 are engaged with the attachment notches 57B. The width of the servo unit 74 is smaller than the distance between the two opposed attachment blocks 57A. After the flanges 74 are engaged with the attachment notches 57B, the servo unit 74 is, as shown in FIG. 30B, moved laterally to have its position determined.

For aligning the servo unit 74, a light source for emitting reference light, a mechanism for aligning the optical disk drive, a mechanism for moving the servo unit 74, and an adjustment facility having the ability to monitor light on a screen are installed outside the optical disk drive. After the servo unit 74 is placed in the space between the attachment blocks 57A, the adjustment facility emits reference light to the servo unit 74. The servo unit 74 is then moved so that the light irradiated to a screen located at a position opposite to the adjustment facility with the servo unit 74 between them will fall on a proper position on the screen. The position of the servo unit 74 is thus adjusted. The servo unit 74 is then fixed in the position which permits the reference light to fall on the proper position, using an adhesive. For attaching the servo unit 74 to the attachment blocks 57A according to the conventional method, the expensive and high-precision facility is needed. Besides, many man-hours are required for adjustment. This leads to an increase in the cost of the whole optical disk drive. Moreover, too much time is required for maintenance of the facility and adjustment of the position of the servo unit. This poses a problem in that the efficiency in manufacturing the optical disk drive is very poor.

Figure 31A:
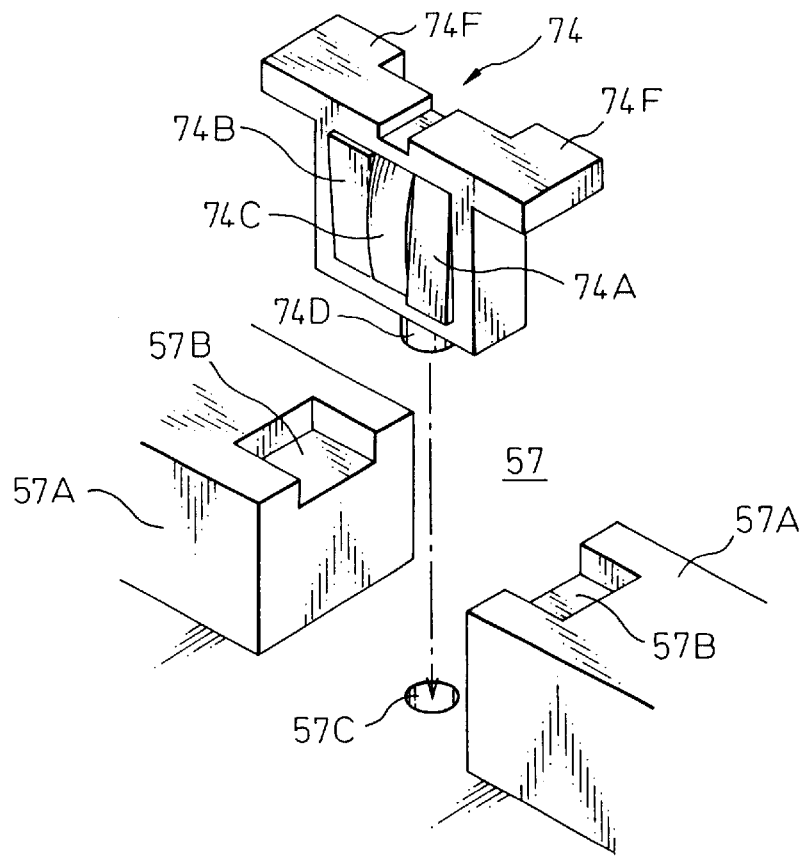
FIG. 31A and FIG. 31B are perspective drawings showing part of the stationary optical unit in the optical disk drive in accordance with the present invention, thus explaining how to align a servo unit.
Figure 31B:
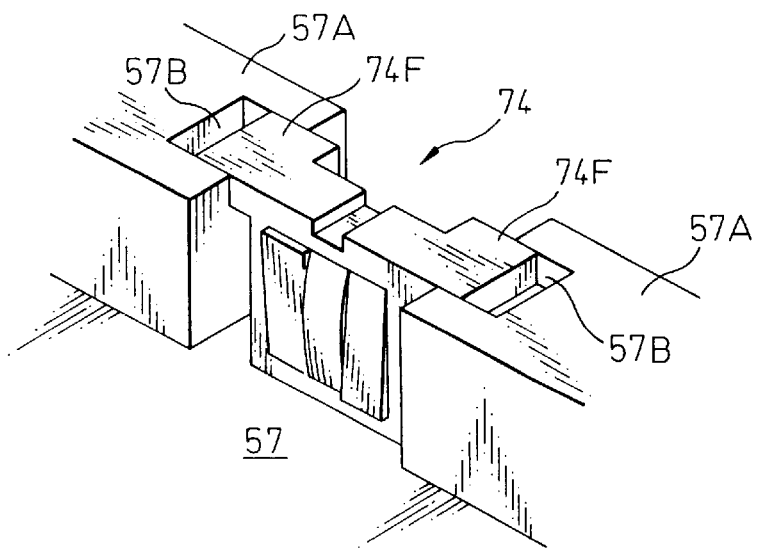

According to the present invention, as shown in FIG. 31A, the alignment projection 74D is formed on the bottom of the servo unit 7 having the same structure as the conventional servo unit. Moreover, the alignment hole 57C that receives the alignment projection 74D is bored in the bottom of the stationary optical unit 57 between the attachment blocks 57A. The alignment hole 57C is finished highly precisely through post-machining. While the alignment projection 74D projecting from the bottom of the servo unit 74 is fitted into the alignment hole 57C bored in the bottom of the stationary optical unit 57, the flanges 74F are engaged with the attachment notches 57B. Consequently, the servo unit 74 is, as shown in FIG. 31B, attached to the attachment blocks 57A.

Consequently, the present invention obviates the necessity of the expensive high-precision adjustment facility. The work of attaching the servo unit 74 that is an optical element can be simplified and speeded up. This leads to a reduction in the cost of an optical disk drive.

Finally, the structure of a printed-circuit board on which a sensor to be locked in the farthest end of the second groove 572 is mounted will be described below. Beforehand, the disadvantage of the conventional structure of a sensor-mounted printed-circuit board will be described.

Figure 32A:
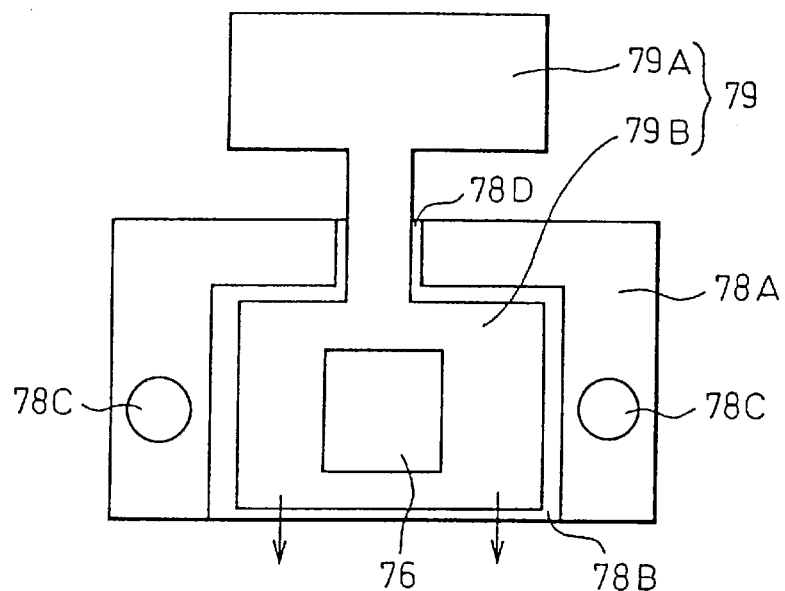
FIG. 32A shows the structure of a sensor mount employed in the conventional optical disk drive and the structure of a sensor-mounted flexible printed-circuit board to be mounted in the sensor mount.
Figure 32B:
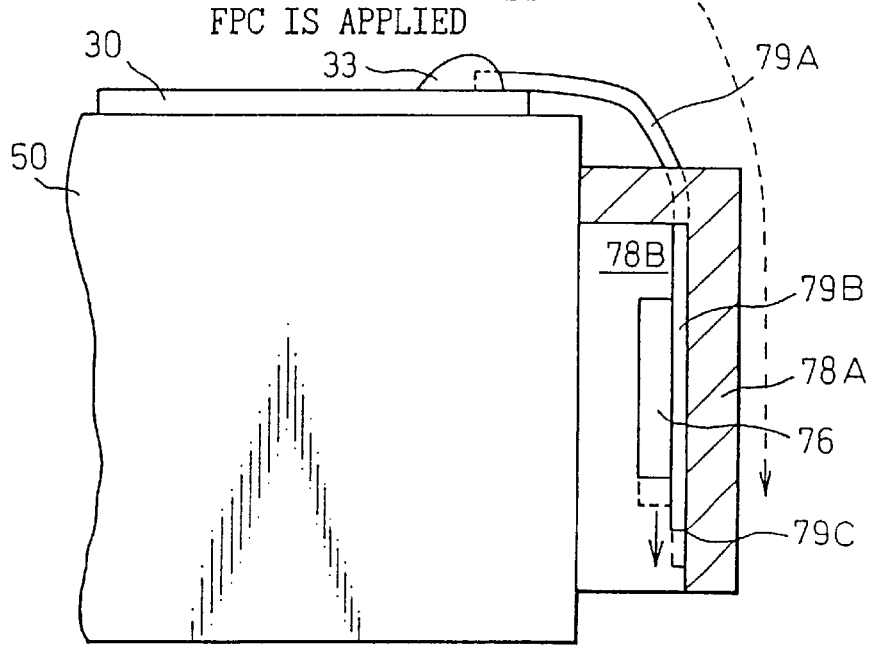
FIG. 32B is a side view showing part of the structure of the sensor mount employed in the conventional optical disk drive, and thus explaining the disadvantage of the structure.

FIG. 32A and FIG. 32B are explanatory diagrams concerning the conventional structure of a flexible printed-circuit board, on which the sensor 76 is mounted, adopted for an optical disk drive. The sensor 76 is generally mounted on the flexible printed-circuit board 79. The flexible printed-circuit board 79 is mounted in a sensor mount 78A. The other end of the flexible printed-circuit board 79 is coupled to the printed-circuit board 30 shown in FIG. 22 to FIG. 24. The flexible printed-circuit board 79 has a board-coupled portion 79A that is coupled to the printed-circuit board and a sensor-mounted portion 79B. Part of the sensor-mounted portion communicating with the sensor-mounted portion has a smaller width. The sensor mount 78A is shaped like a rectangle, and has a concave part 78B, which receives the sensor-mounted portion 79B of the flexible printed-circuit board 79, formed in the center thereof. Attachment holes 78C are bored across the concave part 78B. One edge of the concave part 78B facing the bottom cover (lower end in the drawing) is left open. A leading-out groove 78D used to lead out the small-width part of the board-coupled portion 79A of the flexible printed-circuit board 79 is formed on the other edge of the sensor mount 78A facing the top cover (upper end in the drawing).

The sensor-mounted portion 79B of the flexible printed-circuit board 79 is, as shown in FIG. 32B, locked in the concave part 78B of the sensor mount 78A using an adhesive. The board-coupled portion 79A of the flexible printed-circuit board 79 is coupled to the printed-circuit board 30 using a solder 33. In this case, for preventing the sensor 76 in the concave part 78B from moving due to tension exerted by the flexible printed-circuit board 79, the flexible printed-circuit board 79 has been folded in the past. This is intended to prevent tension from being applied to the sensor-mounted portion 79B. Moreover, a thin expensive flexible printed-circuit board is adopted as the flexible printed-circuit board 79 so that the flexible printed-circuit board 79 will exert little tension.

According to the conventional structure of a sensor-mounted printed-circuit board, since manual work is necessary to fold the flexible printed-circuit board 79, many man-hours are required. Moreover, the method of folding the flexible printed-circuit board 79 is different from worker to worker. It occurs that the flexible printed-circuit board 79 is broken because of insufficient folding, or on the contrary, that the flexible printed-circuit board 79 is cut because of excessive folding. Furthermore, the adoption of a thin flexible printed-circuit board as the flexible printed-circuit board 79 increases the cost of an optical disk drive.

Furthermore, the adhesion of the adhesive used to bond the sensor-mounted portion 79B of the flexible printed-circuit board 79 and the sensor mount 78A deteriorates with a rise in ambient temperature. This causes the distal end 79C of the sensor-mounted portion 79B to move within the sensor mount 78A as indicated with a dashed line in FIG. 32B despite application of only slight tension. The position of the sensor 76 is thus changed to disable accurate detection.

Figure 33A:
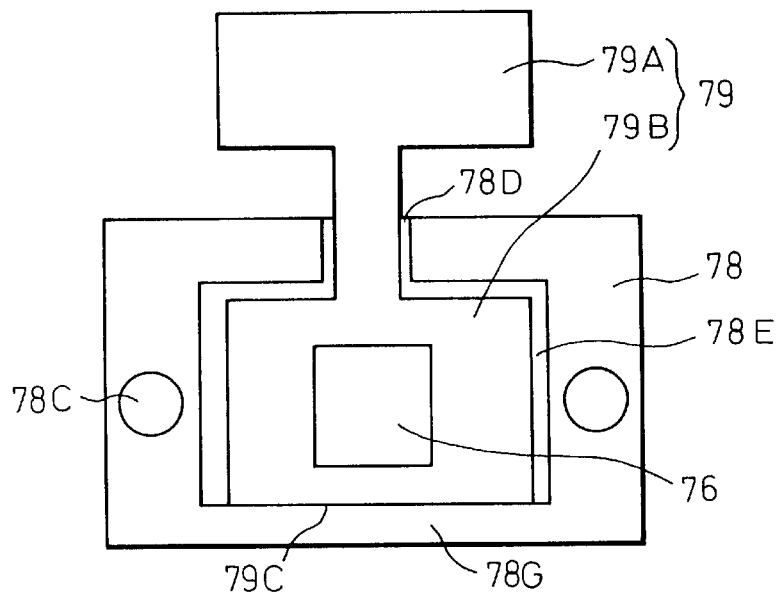
FIG. 33A shows the structure of a sensor mount employed in the optical disk drive in accordance with the present invention, and the structure of a sensor-mounted flexible printed-circuit board to be mounted in the sensor mount.
Figure 33B:
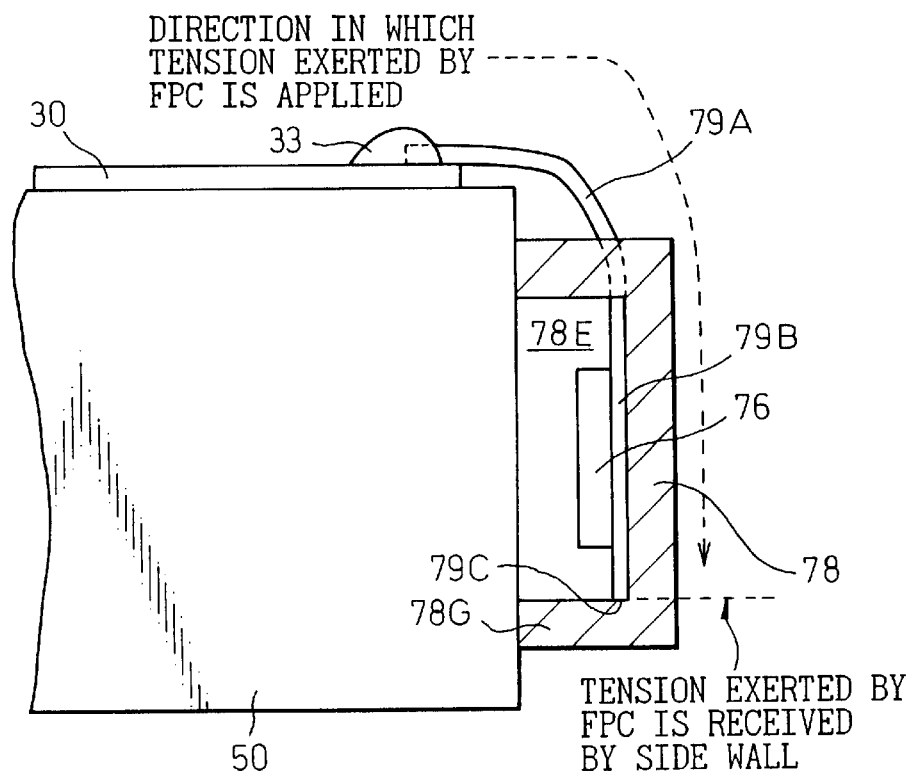
FIG. 33B is a side view showing part of the structure of the sensor mount employed in the optical disk drive in accordance with the present invention, and thus explaining the advantage of the structure.

In contrast, according to the structure of a sensor-mounted printed-circuit board shown in FIG. 33A and FIG. 33B and adopted in the present invention, a sidewall 78G is formed on even an edge of a concave part 78E of the sensor mount 78 facing the top cover. According to the present invention, the concave part 78E is shaped like a rectangle and surrounded with sidewalls 78G, though a drawn-out groove 78D traverses one sidewall 78G. On the other hand, according to the present invention, a flexible printed-circuit board having the same shape as the conventional one shown in FIG. 32A and FIG. 32B may be adopted as the flexible printed-circuit board 79. The procedure of mounting the sensor 76 on the sensor-mounted portion 79B is the same as the conventional one.

However, according to the present invention, when the flexible printed-circuit board 79 is locked in the concave part 78E using an adhesive, the distal end 79C of the sensor-mounted portion 79B must impact against the sidewall 78G. Therefore, even if tension exerted by the board-coupled portion 79A of the flexible printed-circuit board 79 is applied to the sensor-mounted portion 79B, or even if the adhesion of the adhesive deteriorates due to a rise in ambient temperature, the flexible printed-circuit board 79 will not move farther. This is because the distal end 79C of the flexible printed-circuit board abuts against the sidewall 78G. It is therefore unnecessary to fold the flexible printed-circuit board 79 in advance. Moreover, an expensive thin flexible printed-circuit board need not be adopted as the flexible printed-circuit board 79.

In the example shown in FIG. 33A and FIG. 33B, the sidewall 78G is formed even on the edge of the concave part 78E of the sensor mount 78 facing the top cover. To prevent the distal end 79C of the flexible printed-circuit board 79 from moving due to a rise in temperature, a plurality of projections may be formed on the edge of the concave part 78B of the sensor mount 78, which is described in conjunction with FIG. 32A and FIG. 32B, instead of the sidewall. The distal end 79C of the flexible printed-circuit board 79 may be abut against the projections.

As mentioned above, according to the present invention, the shape of the sensor mount 78 is modified. Consequently, a shift of a flexible printed-circuit board derived from tension exerted by the flexible printed-circuit board will not occur. This obviates the necessity of folding the flexible printed-circuit board in advance, and leads to an improved ease-of-manufacture. Moreover, since an expensive thin flexible printed-circuit board need not be adopted, the manufacturing cost of an optical disk drive is reduced.

As mentioned above, the improvement of an optical system in accordance with the present invention makes it easy to manufacture the optical disk drive 1. Consequently, the cost of the optical disk drive can be minimized.

In the aforesaid embodiment, a storage device in accordance with the present invention has been described based on an optical disk drive employing a magneto-optical disk as a storage medium. A loading mechanism in accordance with the present embodiment described in relation to the embodiment may be adapted to a storage medium other than the magneto-optical disk. For example, the loading mechanism in accordance with the present invention may be adapted to a compact disk (CD) that is reproducible and reprogrammable, an optical disk such as a digital versatile disk (DVD), and a floppy disk realized with a magnetic disk. In this case, the disk may not be stowed in a cartridge or may be stowed in a carrier or a holder only when inserted into a storage device. Moreover, the loading mechanism in accordance with the present invention is adaptable to a type of storage device into which a disk is loaded while being placed on a tray.

Likewise, a stationary optical unit in accordance with the present invention described in relation to the aforesaid embodiment may be adapted to a storage medium other than the magneto-optical disk. For example, the stationary optical unit in accordance with the present invention can be applied to an optical disk drive employing a compact disk (CD) that is reproducible or reprogrammable or an optical disk such as a digital multipurpose disk (DVD).

Furthermore, a storage device in accordance with the present invention includes not only a disk drive for recording or reproducing information in or from a storage medium shaped like a disk but also a disk drive capable of creating or formatting a storage medium. The storage device in accordance with the present invention also includes a storage device employing a storage medium such as a memory card.

What is claimed is:

1. A chassis of a storage device employing an optical storage medium, the chassis having a base including at least a movable optical unit stowage for installing a movable optical unit which moves across the tracks of said storage medium, and stationary optical unit for emitting a laser light and for receiving a reflected laser light from said movable optical unit, said stationary optical unit comprising:

a first groove for forming a first optical path which leads the laser light emitted from a laser light source to said movable optical unit; and a second groove for forming a second optical path which leads the reflected laser light from said movable optical unit to a sensor;

wherein an angle at which said second groove meets said first groove is $90°-\alpha°$, where $\alpha$ denotes a positive number, and an angle between said second groove and a moving direction of said movable optical unit is 90°+α°.

2. A chassis according to claim 1, wherein a window is provided on a partition wall which partitions said movable optical unit stowage and said stationary optical unit for passing a laser light from said laser light source and the reflected laser light from said movable optical unit through the partition wall.

3. A chassis according to claim 1, wherein a pedestal for placing a beam splitter which splits and composes the laser light is provided at the intersection portion of said first groove and said second groove.

4. A chassis according to claim 1, wherein a collimator lens-mounted portion composed of two inclined planes that are inclined in mutually opposite directions and are machined after the storage device has been die-cast, is provided in the middle of said first groove.

5. A chassis according to claim 1, wherein a window is formed on a side wall of said chassis at an end portion of said first groove for passing through the laser light emitted from the laser light source provided on an outer surface of said side wall.

6. A chassis according to claim 1, wherein a servo unit aligning portion for aligning a servo unit is provided in the middle of said second groove, and said servo unit aligning portion includes attachment walls opposing each other for holding both sides of said servo unit and a alignment hole, for receiving an alignment projection formed on the bottom of said servo unit, bored on the bottom of said second groove between said attachment walls.

7. A chassis according to claim 1, wherein a condenser lens-mounted portion composed of two inclined planes that are inclined in mutually opposite directions and are machined afterwards to have highly precise dimensions, is provided in the middle of said second groove.

8. A chassis according to claim 1, wherein a window is formed on a side wall of said chassis at an end portion of said second groove for passing the reflected laser light returned from said movable optical unit to a sensor provided on an outer surface of said side wall.

9. A chassis according to claim 1, wherein shapes of a vertical section of said first and second grooves are both almost rectangular.

10. A chassis according to claim 1, wherein a light level monitor stowage is provided next to said first groove towards said beam splitter placed on a pedestal.

11. A chassis according to claim 1, wherein screw holes for screws which are used to fix a sheet presser for pressing a collimator lens or a condenser are provided on an upper surface of walls facing each other around two inclined planes in said first and second grooves.

12. A storage device employing an optical storage medium, comprising:
a first light path along which laser light emanating from a laser light source passes through a collimator lens and a beam splitter and is routed to a movable optical system that accesses an optical storage medium;
a second light path along which light reflected from said optical storage medium and returned from said movable optical system is split into a plurality of rays by said beam splitter, and one of the rays is routed to a sensor, which has the abilities to detect information recorded on said optical storage medium, to detect a focus state of laser light converged on said optical storage medium, and to detect a track on said optical storage medium to which the laser light is irradiated, via a servo unit and a condenser; wherein an obtuse angle at which said second light path meets said first light path is 90°+α°, where α denotes a positive number;
a flexible printed-circuit board on which said sensor to be disposed on said second light path is mounted on one end;
a sensor mount in which a sensor-mounted portion of said flexible printed-circuit board is mounted;
a printed-circuit board placed on the back of a chassis on which said second light path is defined, and coupled to the other end of said flexible printed-circuit board;
a concave part formed in said sensor mount in order to receive said sensor-mounted portion of said flexible printed-circuit board;
a leading-out groove formed in said sensor mount and used to lead said flexible printed-circuit board out of said concave part; and
a wall which is formed on an edge of said concave part and against which an end of said sensor-mounted portion of said flexible printed-circuit board abuts,
wherein said sensor-mounted portion of said flexible printed-circuit board is provided in said concave part with said end of said sensor-mounted portion of said flexible printed-circuit board abutting against said wall.

13. A storage device according to 12, further comprising:
an alignment projection formed on a bottom surface of said servo unit opposed to said second light path; and
an alignment hole which is bored in a bed of said second light path so that the alignment hole will coincide with said alignment projection, and into which said alignment projection is fitted without a gap.

14. A storage device according to claim 12, wherein a chassis of said storage device is die-cast, and a stationary optical unit having said first and second light paths defined therein is formed as an integral part of said die-cast chassis at an end of said chassis.

15. A storage device according to claim 14, wherein said chassis is machined after said storage device has been die-cast in order to create planes along said first and second light paths, and said collimator lens and condenser are placed on the planes.

16. A storage device according to claim 12, wherein said beam splitter is realized with a beam splitter whose reflecting surface is inclined against a vertical plane to the beam by 45° and which is turned by α/2° with respect to the ray axis of light propagated along said first light path.

17. A storage device according to claim 12, wherein said beam splitter has a reflecting surface thereof inclined by 45°−(α/2)° with respect to the ray axis of light propagated along said first light path.

18. A storage device according to claim 12, wherein a projection against which the end of said sensor-mounted portion of said flexible printed-circuit board is abutted is formed within said concave part, and said sensor-mounted portion of said flexible printed-circuit board is locked in said concave part with the end of said sensor-mounted portion of said flexible printed-circuit board abutting against said projection.

* * * * *